(12) United States Patent
Cho

(10) Patent No.: US 7,222,908 B1
(45) Date of Patent: May 29, 2007

(54) AUTOMOTIVE OPEN AIR SYSTEM

(75) Inventor: Yangsoo Cho, Lasalle (CA)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 11/342,369

(22) Filed: Jan. 27, 2006

(51) Int. Cl.
*B62D 15/10* (2006.01)

(52) U.S. Cl. ............... 296/76; 296/146.8; 296/216.04

(58) Field of Classification Search ............ 296/76, 296/146.8, 146.18, 216.04, 220.01
See application file for complete search history.

(56) References Cited

U.S. PATENT DOCUMENTS

| | | | | |
|---|---|---|---|---|
| 4,801,174 A * | 1/1989 | Hirshberg et al. | ..... | 296/216.04 |
| 5,031,949 A | 7/1991 | Sorimachi et al. | | |
| 5,135,280 A | 8/1992 | Geletka | | |
| 5,558,388 A | 9/1996 | Fürst et al. | | |
| 5,803,534 A | 9/1998 | Murkett et al. | | |
| 5,921,611 A * | 7/1999 | Townsend | ................ | 296/146.8 |
| 6,254,165 B1 | 7/2001 | Neubrand | | |
| 6,279,989 B1 * | 8/2001 | Marchart et al. | ........ | 296/146.8 |
| 6,485,094 B2 * | 11/2002 | Corder et al. | .......... | 296/220.01 |
| 6,494,528 B2 * | 12/2002 | Tolinski et al. | ........ | 296/216.04 |
| 6,497,448 B1 * | 12/2002 | Curtis et al. | ............. | 296/146.8 |
| 6,513,865 B1 | 2/2003 | Lutz et al. | | |
| 6,604,782 B2 | 8/2003 | De Gaillard et al. | | |
| 6,623,064 B2 * | 9/2003 | Schutt et al. | .......... | 296/216.01 |
| 6,634,699 B2 | 10/2003 | Collins et al. | | |
| 6,641,201 B1 * | 11/2003 | Pietryga et al. | .......... | 296/100.1 |
| 6,672,658 B2 * | 1/2004 | De Gaillard | ........... | 296/220.01 |
| 6,783,172 B2 * | 8/2004 | De Gaillard | ........... | 296/220.01 |
| 6,880,884 B2 * | 4/2005 | Sugiura | ................. | 296/216.08 |
| 7,017,972 B2 * | 3/2006 | Rudolph et al. | ........ | 296/220.01 |
| 7,114,769 B2 * | 10/2006 | Storc et al. | .................. | 296/219 |
| 2001/0017478 A1 | 8/2001 | Reinsch | | |
| 2001/0040394 A1 * | 11/2001 | DeGaillard | ............ | 296/220.01 |
| 2002/0003359 A1 | 1/2002 | De Gaillard | | |
| 2002/0067054 A1 | 6/2002 | Corder et al. | | |
| 2003/0015891 A1 * | 1/2003 | Doll et al. | ............. | 296/216.08 |
| 2003/0075948 A1 * | 4/2003 | De Gaillard | ............. | 296/146.8 |
| 2003/0168884 A1 | 9/2003 | Collins et al. | | |
| 2003/0214157 A1 | 11/2003 | De Gaillard | | |

FOREIGN PATENT DOCUMENTS

EP  0 101 322 A2  8/1983

* cited by examiner

*Primary Examiner*—Kiran B. Patel
(74) *Attorney, Agent, or Firm*—Harness, Dickey & Pierce, P.L.C.

(57) ABSTRACT

An open air system can be utilized on a vehicle with a liftgate configuration. The open air system does not interfere or hinder operation of the liftgate between the open and closed positions. The open air system can include one or more roof panels that are moveable relative to the vehicle roof to provide an open air motoring experience. The moveable panels can be moved to a position above or below the liftgate. The moveable panels can move with the liftgate between the open and closed positions.

27 Claims, 25 Drawing Sheets

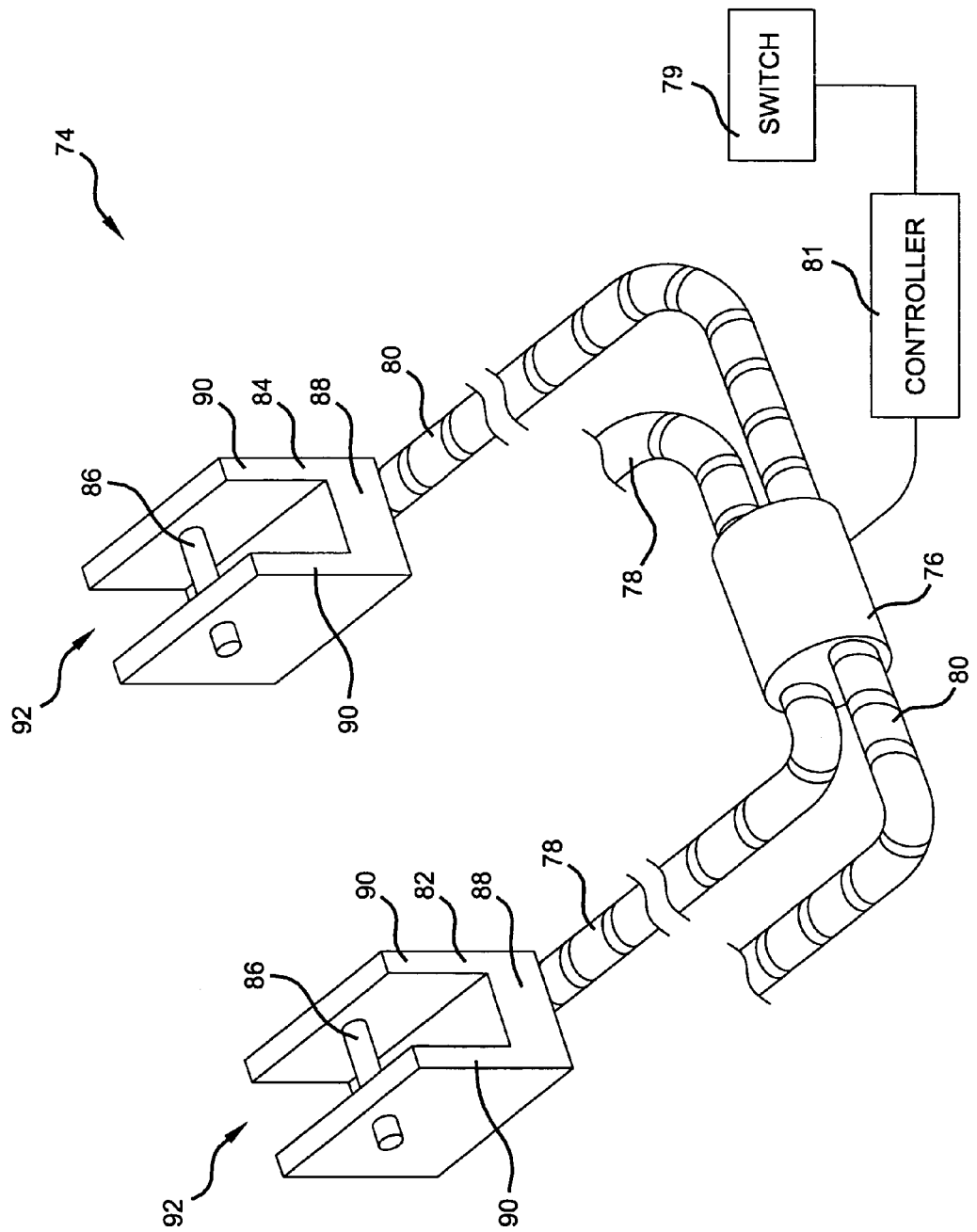

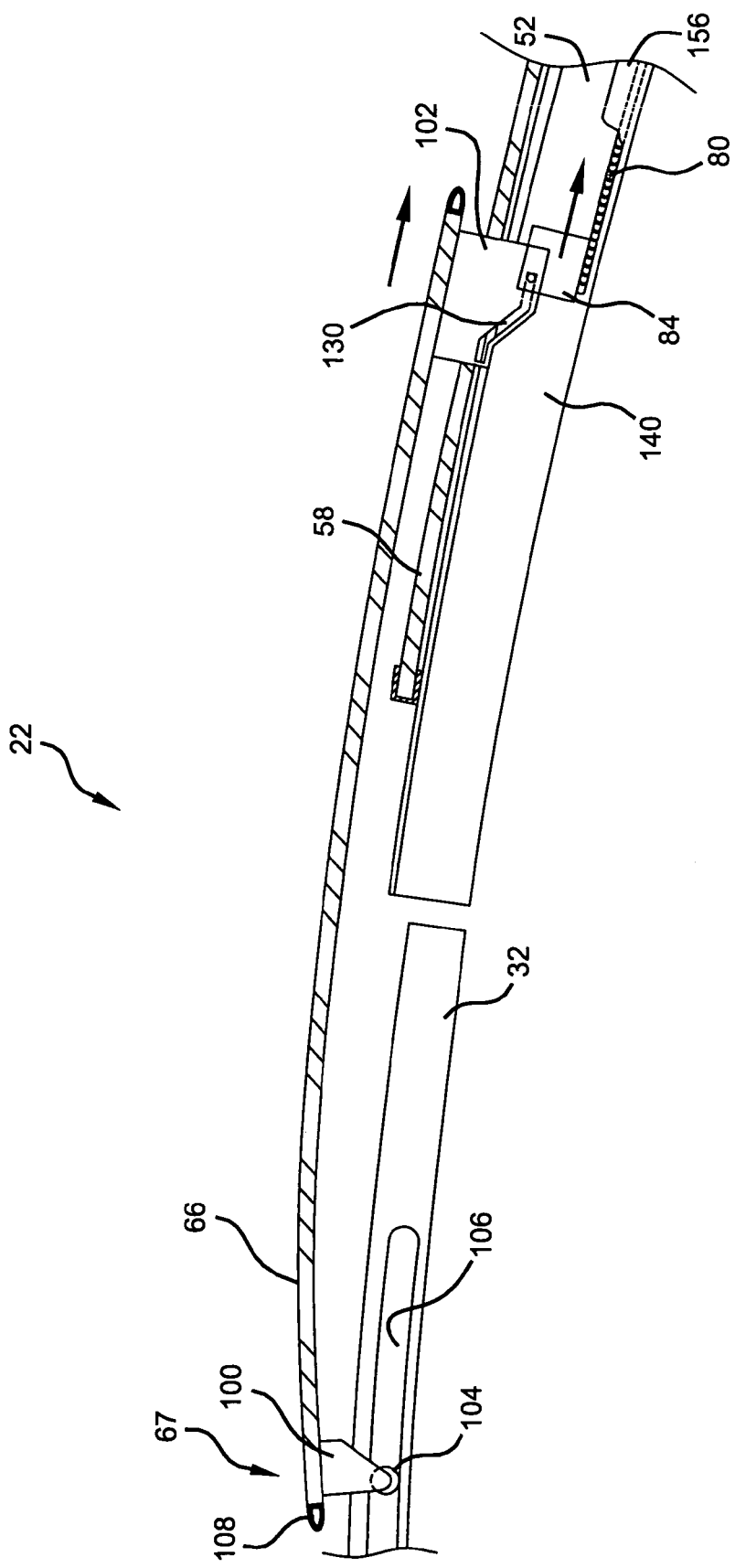

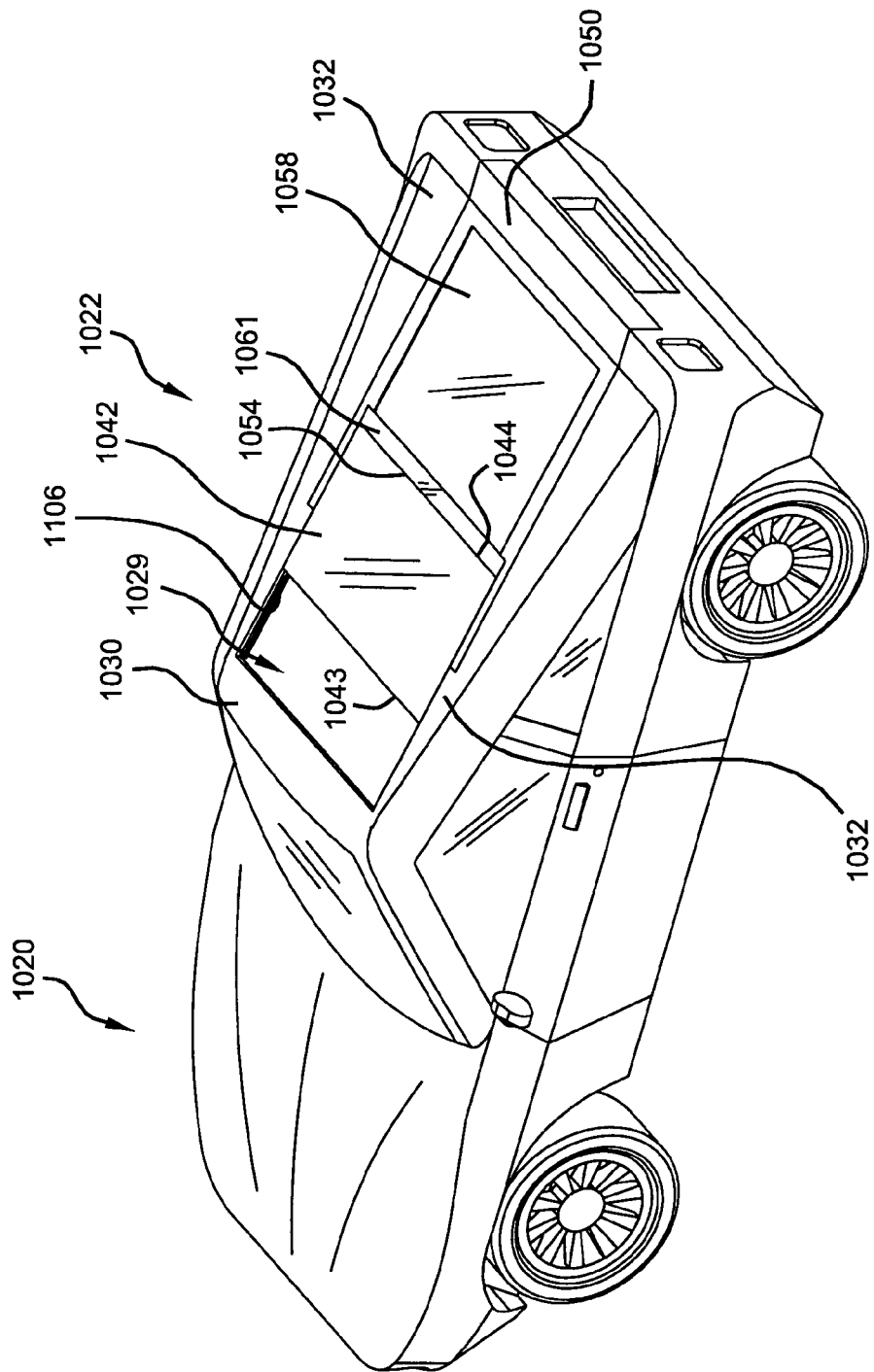

AUTOMOTIVE OPEN AIR SYSTEM

BACKGROUND AND SUMMARY OF THE INVENTION

The present invention relates to automotive vehicles and, more particularly, to open air systems for automotive vehicles.

Automotive vehicles come in a variety of shapes, sizes and configurations. For example, some automotive vehicles are two-door coupes while others are four-door sedans. Some of the vehicles may include a traditional trunk or may have a liftgate also known as a hatchback. The liftgate advantageously provides a large opening to facilitate access to the storage area in the rear of the vehicle and may also allow access to the seating area of the vehicle. Additionally, the liftgate can also provide an aesthetically-pleasing appearance for the vehicle.

To provide a more pleasing driving experience, some automotive vehicles include a sunroof or moveable roof panels. A sunroof and moveable roof panels are collectively referred to herein as "roof panels." The moveable roof panels may be capable of tilting to provide extra ventilation for the interior vehicle and/or may be capable of moving between a position corresponding to providing an enclosed space for the passenger seating area and a position wherein an opening of the vehicle roof is realized to provide an open air driving experience. Such systems may be referred to as automotive open air systems.

To provide the open air experience, the roof panels are typically moved rearwardly relative to the roof structure and may move to a position that is above or below the exterior of the roof. In vehicles having a liftgate configuration, this rearward movement of the roof panel(s) may inhibit and/or prevent the opening and closing of the liftgate when the roof panel(s) is in the rearward position. As a result, the roof panel(s) may need to be moved to the forward position corresponding to enclosing the passenger seating area prior to the operation of the liftgate. This requirement can be inconvenient and may also increase the number of times that the moveable roof panels are moved between the two positions resulting in a reduced lifespan and/or premature failure of one or more components of the open air system. Thus, open air systems utilizing moveable roof panels may disadvantageously limit the normal operation of a vehicle having a liftgate configuration.

In accordance with the present invention, an automotive vehicle open air system includes a liftgate, a backlite disposed in the liftgate, and at least one roof panel moveable in a fore and aft direction between first and second positions and the liftgate is operable between open and closed positions regardless of a position of the at least one roof panel. In another aspect of the present invention, a first portion of the roof panel is engaged with the liftgate and moves with movement of the liftgate when in at least one of the first and second positions and a second portion of the roof panel is engaged with a fixed roof structure. In still another aspect of the present invention, first and second roof panels are moveable in the fore and aft direction between first and second positions and the first roof panel is coupled to the liftgate and moves with movement of the liftgate when in at least one of the first and second positions, a first portion of the second roof panel is coupled to the liftgate and a second portion of the second roof panel is coupled to the fixed roof structure. In yet another aspect of the present invention, a method of operating an open air system includes moving at least one roof panel in the fore and aft direction between first and second positions, moving a portion of the roof panel with movement of the liftgate when in the second position and moving the liftgate between open and closed positions regardless of a position of the roof panel.

The open air system of the present invention is advantageous over traditional constructions in that the present invention can be utilized on a vehicle with a liftgate configuration. The open air system does not interfere or hinder operation of the liftgate between the open and closed positions. Accordingly, the present invention eliminates the need to have the open air system in a closed position prior to the operation of the liftgate and may reduce the frequency at which the open air system is operated. Additionally, the reduced frequency may result in an increased lifespan for the open air system. Additional advantages and features of the present invention will become apparent from the following description and appended claims, taken in conjunction with the accompanying drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a simplified perspective view of the drive mechanism for the automotive open air system according to the present invention;

FIGS. 3A-3D are cross-sectional views along line 3-3 of FIG. 1A showing the open air system in various positions;

FIGS. 8A-8E are perspective views of an automotive vehicle having an open air system according to a second preferred embodiment with the open air system in various positions;

DETAILED DESCRIPTION OF THE PREFERRED EMBODIMENTS

Figure 1A:
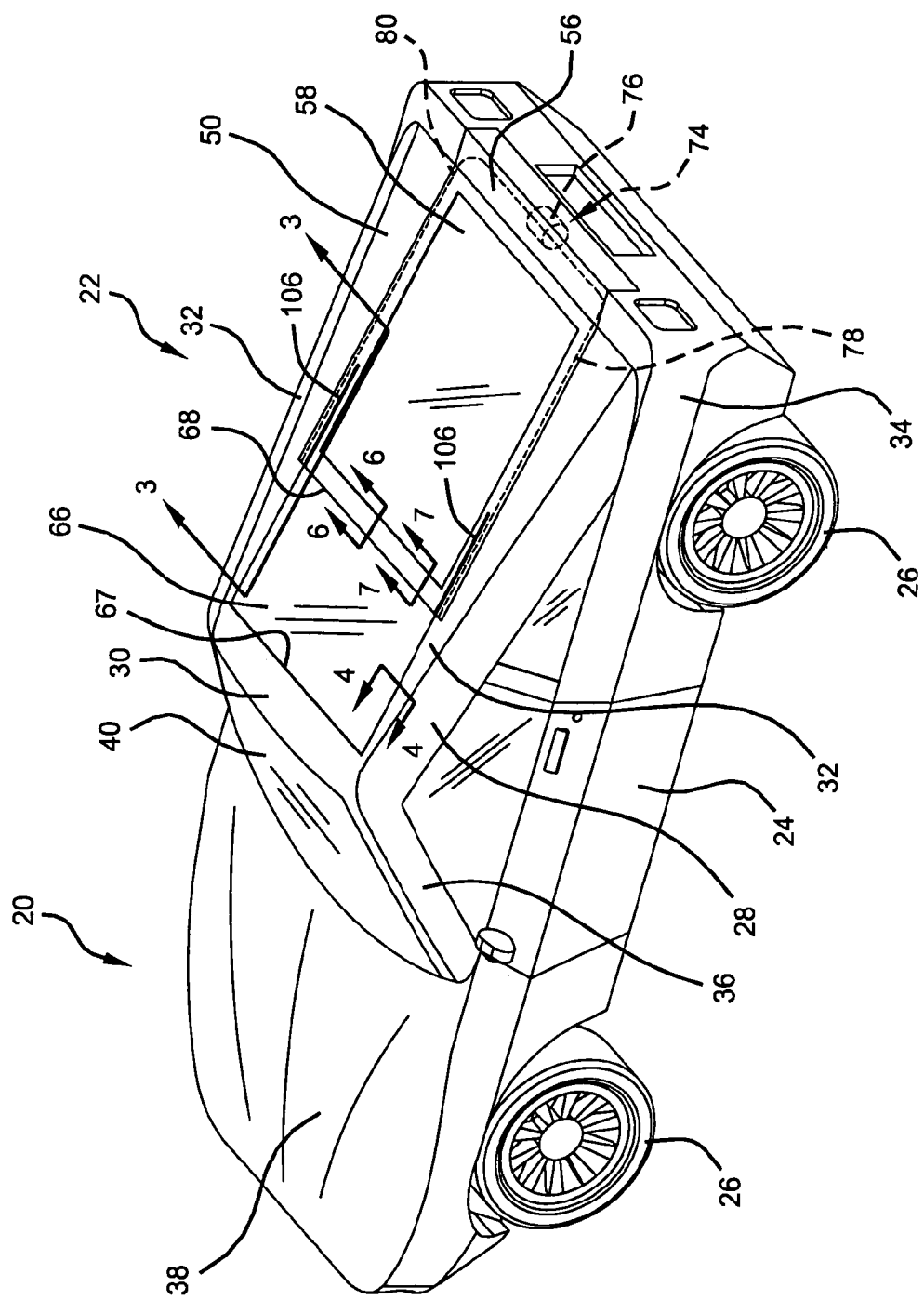
FIGS. 1A-1D are perspective views of an automotive vehicle having an open air system according to a first preferred embodiment with the open air system in various positions.

The following description of the preferred embodiments is merely exemplary in nature and is in no way intended to limit the invention, its application, or uses.

Referring to FIG. 1, an automotive vehicle 20 having an open air system 22 according to a first preferred embodiment is shown. Vehicle 20 includes a body 24, wheels 26 and a fixed roof 28. A passenger seating area 29 is located within body 24 beneath roof 28. Fixed roof 28 includes a front header 30 that extends transversely between longitudinally-extending frame members 32. Roof frame members 32 extend longitudinally from front header 30 to the rear quarter panels 34. "A" pillars 36 can extend from front header 30 toward hood 38. A front windshield 40 extends between "A" pillars 36 along front header 30. A storage area 41 is located in the rear of vehicle 20 aft of passenger area 29.

When describing the various embodiments of vehicle 20 and open air system 22 herein, at times only one side of vehicle 20 and/or open air system 22 may be shown or discussed. It should be appreciated, however, that the other side is essentially a mirrored image of the one discussed and illustrated. Moreover, as used herein, the term "fore and aft", "front", "rear" and "longitudinal" may be used to refer to a direction corresponding to extending from the front of the vehicle toward the rear of the vehicle. Additionally, the term "transverse" refers to a cross-vehicle direction and is generally orthogonal to the longitudinal direction of the vehicle. Furthermore, when describing similar features of the various embodiments herein, like reference indicia may be used to describe the similar features. For example, similar features or components may be referred to in a second embodiment by adding 1000 to the reference indicia used in the first embodiment (e.g. vehicle 20 and vehicle 1020, open air system 22 and open air system 1022, etc.).

Figure 1B:
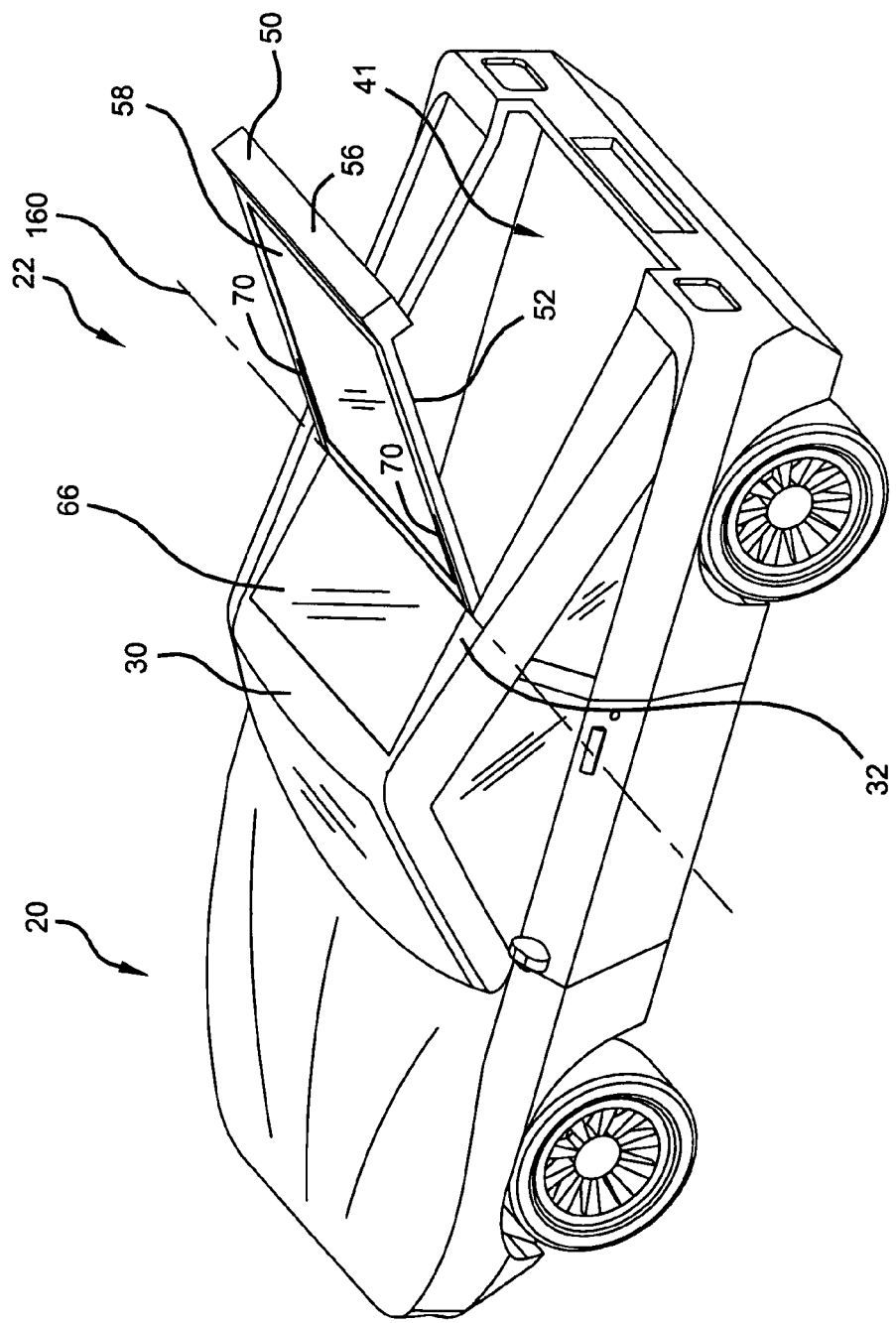

Open air system 22 includes a liftgate 50 moveable between a closed position, shown in FIG. 1A, to an open position, as shown in FIG. 1B. Liftgate 50 forms a rear-opening door of vehicle 20 and can be a substantially-rigid component and can include fore-and-aft extending side members 52 and transversely-extending front and rear members 54, 56 extending therebetween. A backlite 58 can be disposed in liftgate 50. Backlite 58 can be fixed to liftgate 50 such that backlite 58 moves with the movement of liftgate 50 between the open and closed positions. Front member 54 of liftgate 50 is pivotally coupled to fixed roof 28 such that liftgate 50 can pivot about a pivot axis 60 when moving between the open and closed positions, as described below. Rear member 56 of liftgate 50 can be selectively secured to a rear portion of vehicle 20 to maintain liftgate 50 in the closed position. For example, a latching mechanism can be utilized to secure rear member 56 to vehicle 20 and selectively maintain liftgate 50 in the closed position.

Open air system 22 can include a moveable roof panel 66. Roof panel 66 can be transparent, translucent or opaque. Roof panel 66 can be rigid. Roof panel 66 includes a front edge 67, a rear edge 68 and side edges 69 extending longitudinally therebetween and can be disposed between roof frame members 32 between front header 30 and liftgate 50. Roof panel 66 covers at least a portion of passenger area 29. Roof panel 66 can move between a closed position, shown in FIGS. 1A and 1B wherein roof panel 66 is adjacent front header 30, to an open position, shown in FIGS. 1C and 1D wherein roof panel 66 is partially disposed above liftgate 50 and backlite 58. To facilitate the movement of roof panel 66 between the open and closed positions, open air system 22 can include a pair of tracks 70 in side members 52. Tracks 70 are open on the top and allow guide members on roof panel 66 to move therealong when roof panel 66 moves between the open and closed positions. Open air system 22 can also include a motorized cable drive assembly 74, shown in FIGS. 1A and 2, which is operable to moveable roof panel 66 between the open and closed positions, as described below.

Cable drive assembly 74 includes an actuator or motor 76 that is operable to move compression-resistant cables 78, 80 relative thereto in a manner known to those skilled in the art. A controller 81 communicates with motor 76 to control the operation of motor 76 and the movement of cables 78, 80. A switch 79 can be connected to controller 81. Switch 79 can be located in a convenient location in passenger area 29 to facilitate operation of open air system 22 by an occupant within passenger area 29 of vehicle 20. Switch 79 and controller 81 allow cable drive assembly 74 to be commanded to drive the movement of cables 78, 80 in a desired direction corresponding to the desired operation of open air system 22. First cable 78 is fixedly attached to a first carriage 82 and second cable 80 is fixedly attached to a second carriage 84. Each carriage 82, 84 includes a pin 86 that engages with a component on roof panel 66. Cables 78, 80 are relatively stiff and are operable to pull and push carriages 82, 84 to move roof panel 66 between the open and closed positions. Operation of motor 76 in one direction causes cable 78, 80 to be moved toward motor 76 and pull carriages 82, 84 rearwardly. Operation of motor 76 in an opposite direction causes cable 78, 80 to move away from motor 76 and push carriages 82, 84 forward. Cable drive assembly 74 can be contained entirely within liftgate 50.

Each carriage 82, 84 includes a base portion 88 and two upwardly-extending sidewalls 90 spaced transversely apart. Pin 86 extends between sidewalls 90. Base 88 and sidewalls 90 thereby form a U-shaped channel 92 within which a component of roof panel 66 can be disposed, as described below Referring now to FIGS. 3-5, details of the engagement of roof panel 66 with roof 28, liftgate 50 and cable drive assembly 74 are shown. Roof panel 66 includes front legs 100 adjacent front edge 67 and rear legs 102 adjacent rear edge 68. Legs 100, 102 are adjacent each side 69. Front leg 100 can include a roller or wheel 104 pivotally attached thereto. Roller 104 can be disposed within a track 106 in roof frame member 32. Track 106 forms a portion of track 70. Roller 104 is pivotally coupled to front leg 100 such that front leg 100 can pivot relative to roller 104 and roller 104 can rotate relative to front leg 100. Roller 104 rolls along track 106 as roof panel 66 moves between the open and closed positions. A seal 108 is disposed along front edge 67 of roof panel 66 to seal against front header 30.

Figure 4:
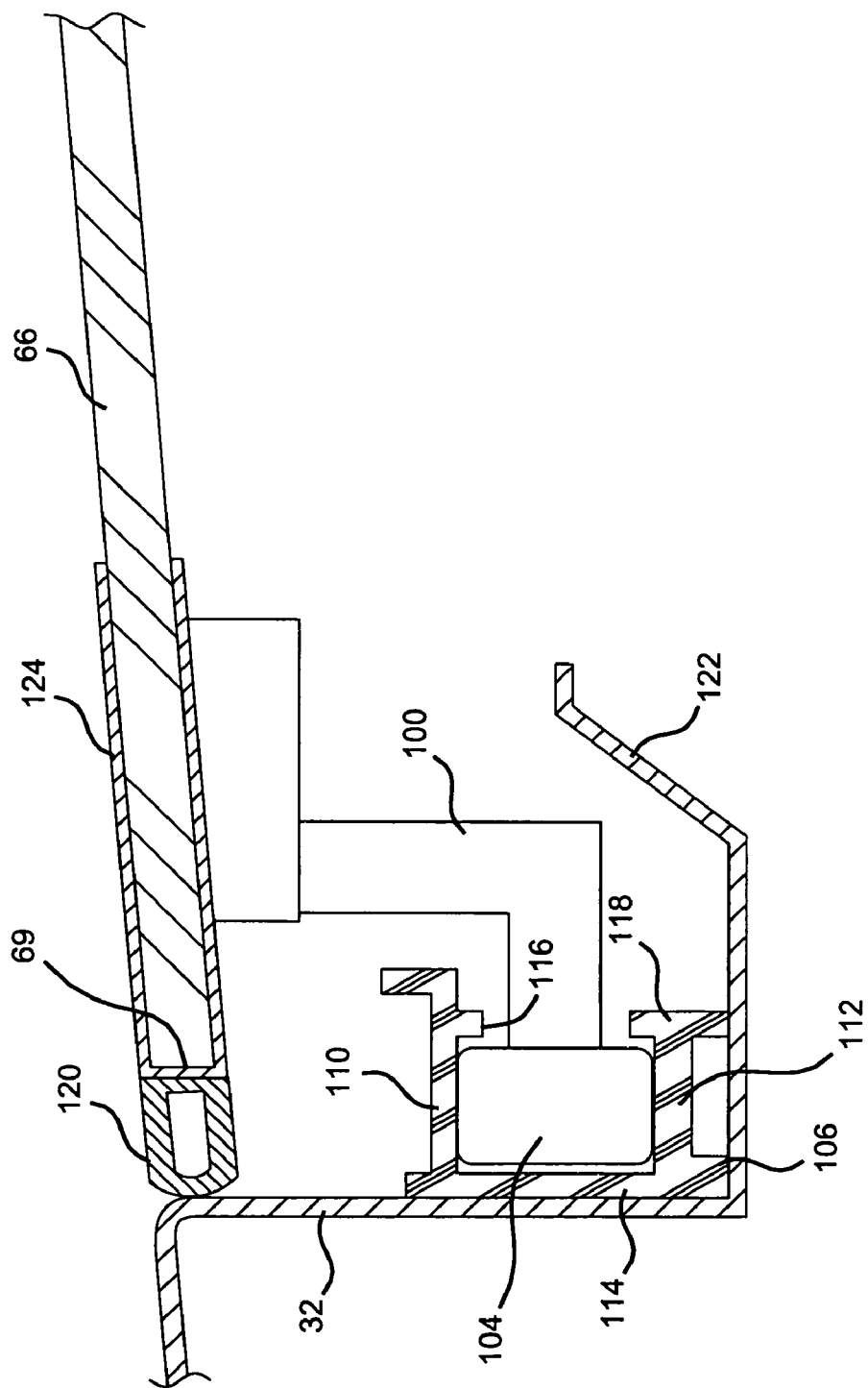
FIG. 4 is a cross-sectional view along line 4-4 of FIG. 1A.

As shown in FIG. 4, roller 104 is vertically constrained by top and bottom walls 110, 112 of track 106. A sidewall 114 extends between top and bottom walls 110, 112. Projections 116, 118 extend toward one another from the respective top and bottom walls 110, 112. Top and bottom walls 110, 112, sidewall 114 and projections 116, 118 define the interior cavity within which roller 104 can move and limit the vertical and transverse movement of roller 104 therein. Track 106 thereby maintains the front portion of roof panel 66 in a desired position during the movement between the open and closed positions.

Side edge 69 of roof panel 66 can include a seal 120 that can form a weathertight seal against roof frame member 32. A lower portion 122 of roof frame member 32 can form a water trough to capture and direct any water that leaks between seal 120 and roof frame member 32 to a desired location. Roof panel 66 can have a garnish or trim member 124 attached along the periphery thereof. Seal 120 can be attached to garnish 124.

Figure 3A:
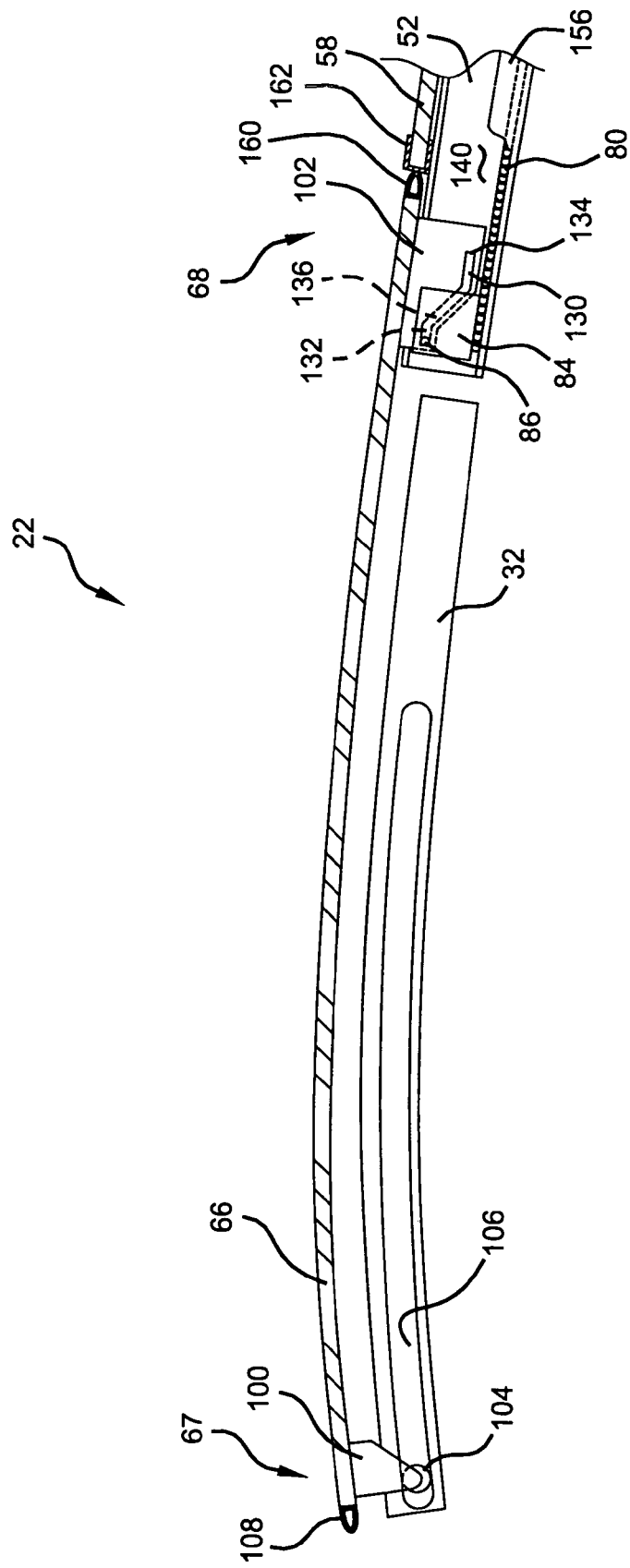
Figure 3B:
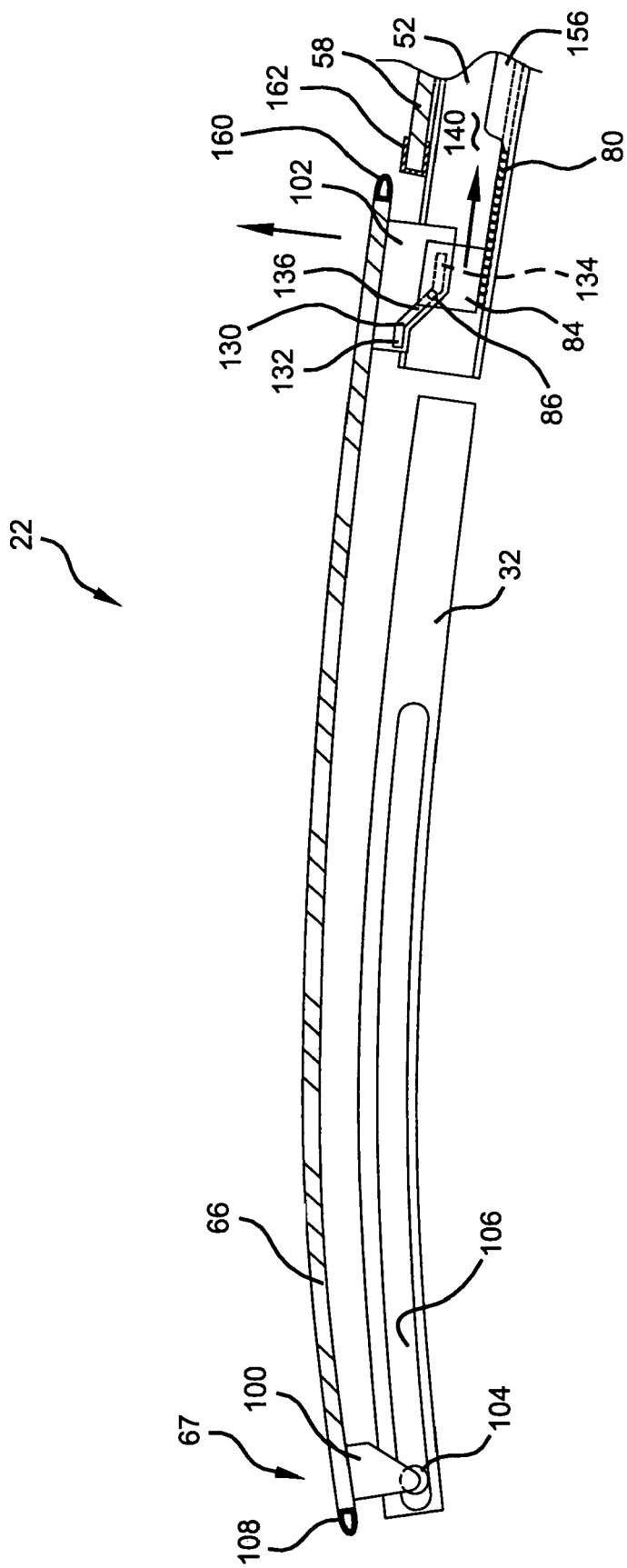
Figure 3D:
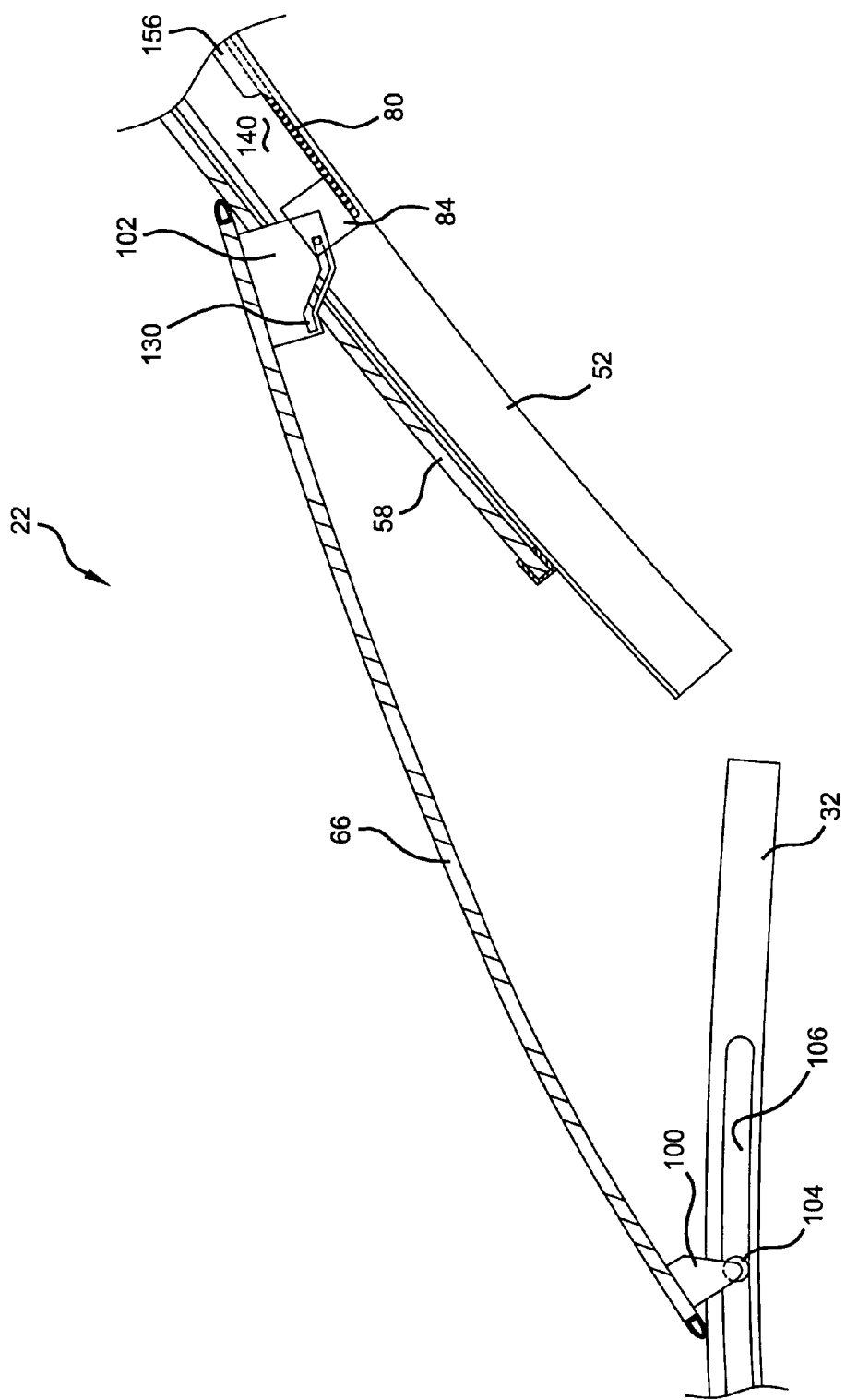
Figure 5:
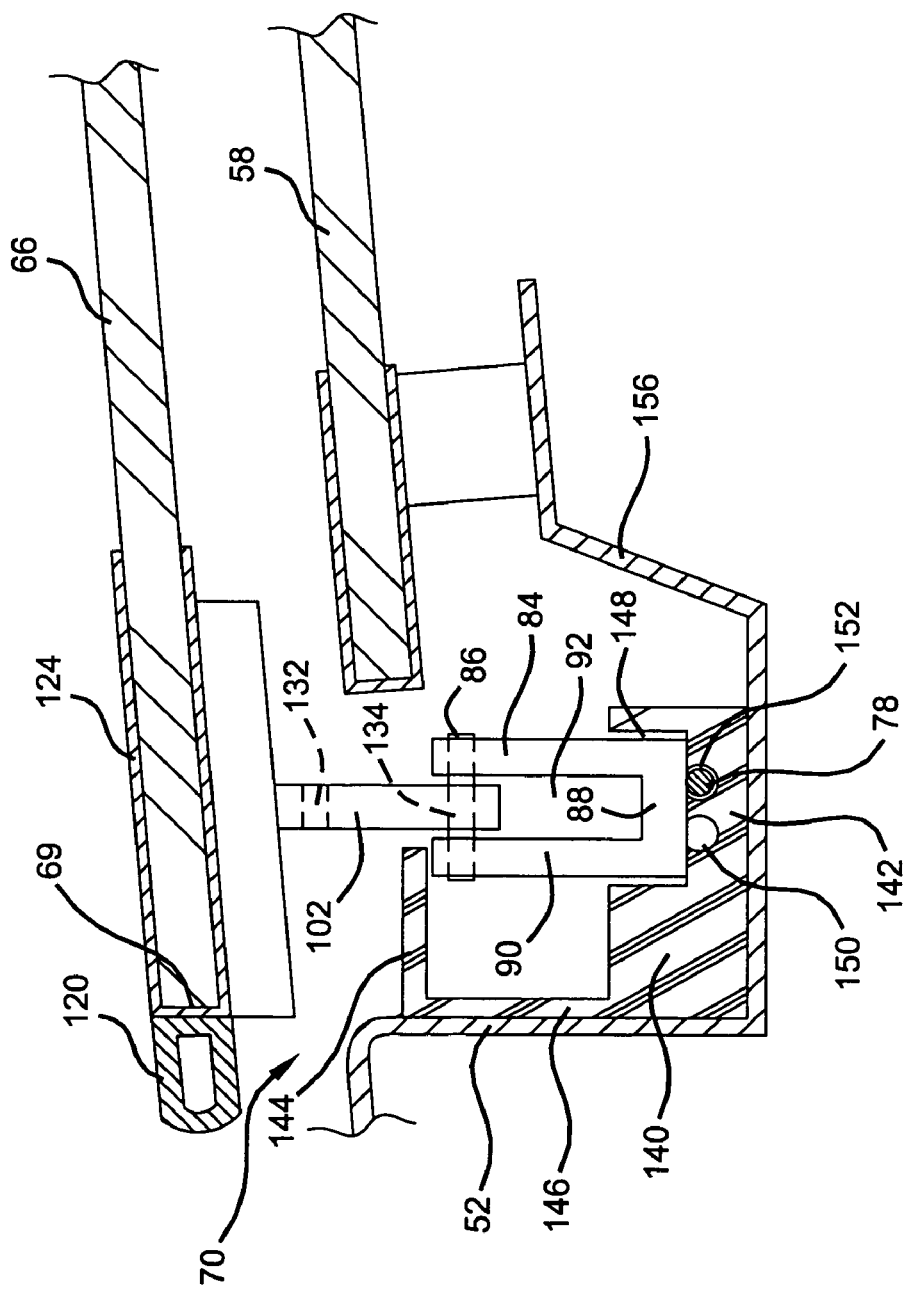
FIG. 5 is a cross-sectional view along line 5-5 of FIG. 1C.

Referring to FIGS. 3 and 5, rear leg 102 can be disposed within channel 92 of carriage 84. Rear leg 102 can include a slot 130 that is disposed around pin 86 in carriage 84. Slot 130 can be Z-shaped with an upper generally-horizontal portion 132, a lower generally-horizontal portion 134 and an intermediate portion 136 extending diagonally therebetween. Carriage 84 is disposed within a track 140 in side member 52 of liftgate 50, as best seen in FIG. 5. Track 140 includes a base 142, a top 144 and a sidewall 146 extending vertically therebetween. Base 142 includes a generally U-shaped channel 148 therein within which the lower portion of carriage 84 can be disposed. Two generally-circular guides 150, 152 are disposed in the bottom of channel 148. Guides 150, 152 are configured to receive cables 80, 78, respectively, therein. For example, cable 78 can be disposed within guide 152. Similarly, the free end of cable 80 can be disposed within guide 150. Guides 150, 152 can direct the movement of cables 80, 78 along track 140 during movement of roof panel 66 between the open and closed positions. Guides 150, 152 prevent the cables therein from interfering with the movement of the carriages as the carriages move along track 140.

Track 140 is disposed within side member 52 of liftgate 50. A lower portion 156 of side member 52 extends upwardly and forms a water trough to catch any water that leaks past seal 120 of roof panel 66. Lower portion 156 directs water captured therein to a desired drainage point.

Figure 6:
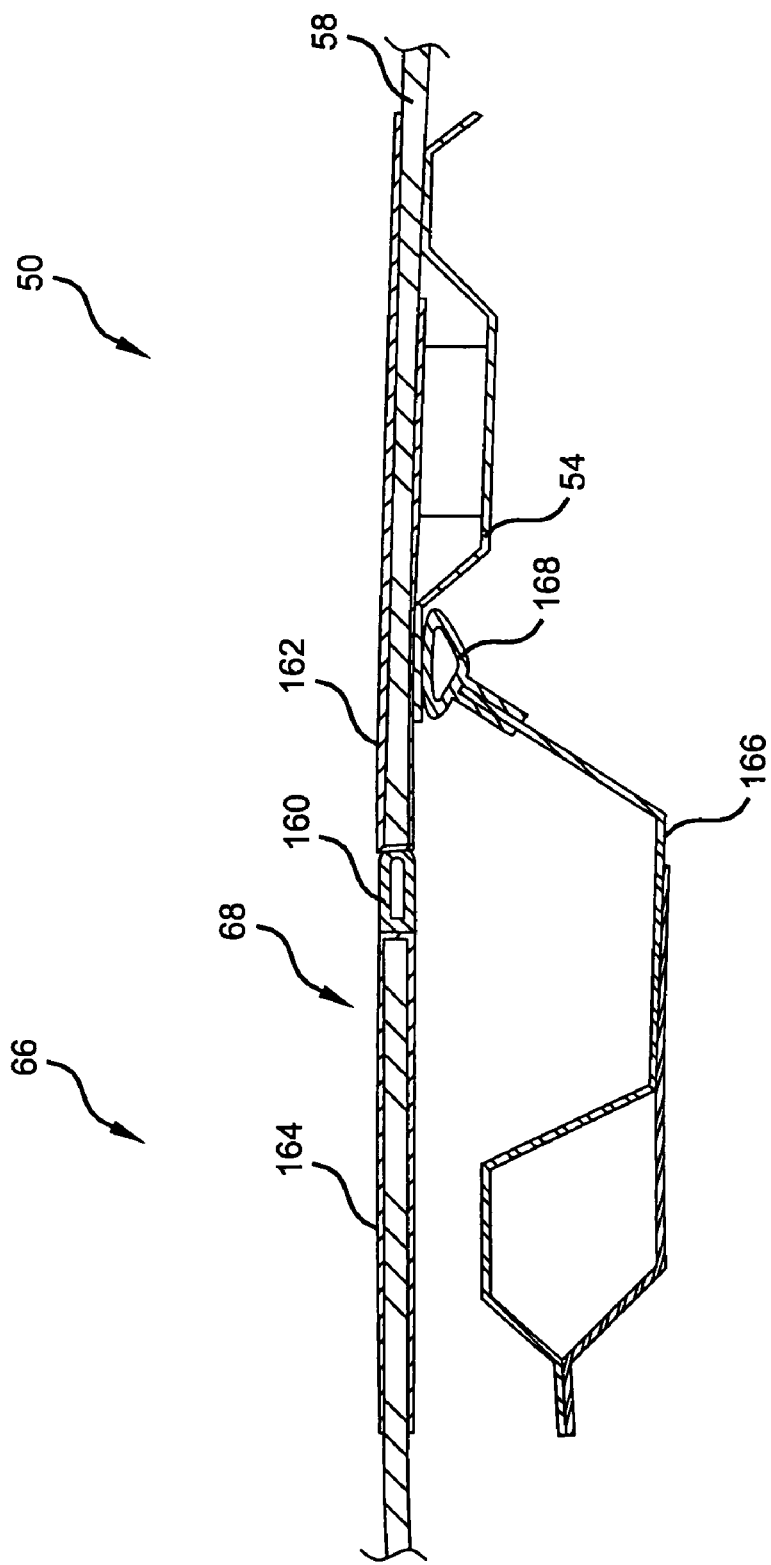
FIG. 6 is a cross-sectional view along line 6-6 of FIG. 1A.

Referring now to FIGS. 3 and 6, rear edge 68 of roof panel 66 includes a seal 160 thereon. Seal 160 engages with a trim piece 162 disposed on the front edge of backlite 58. Another trim piece 164 can be disposed on the rear edge 68 of roof panel 66 and seal 160 can be attached thereto, as shown in FIG. 6. Roof 28 includes a cross-member 166 that extends transversely across vehicle 20 between frame members 32. Cross-member 166 forms a water trough to capture water that escapes between roof panel 66 and liftgate 50. Cross-member 166 can include a seal 168 to prevent water from entering the passenger area 29 of vehicle 20. Seal 168 can seal against front member 54 of liftgate 50.

Figure 7:
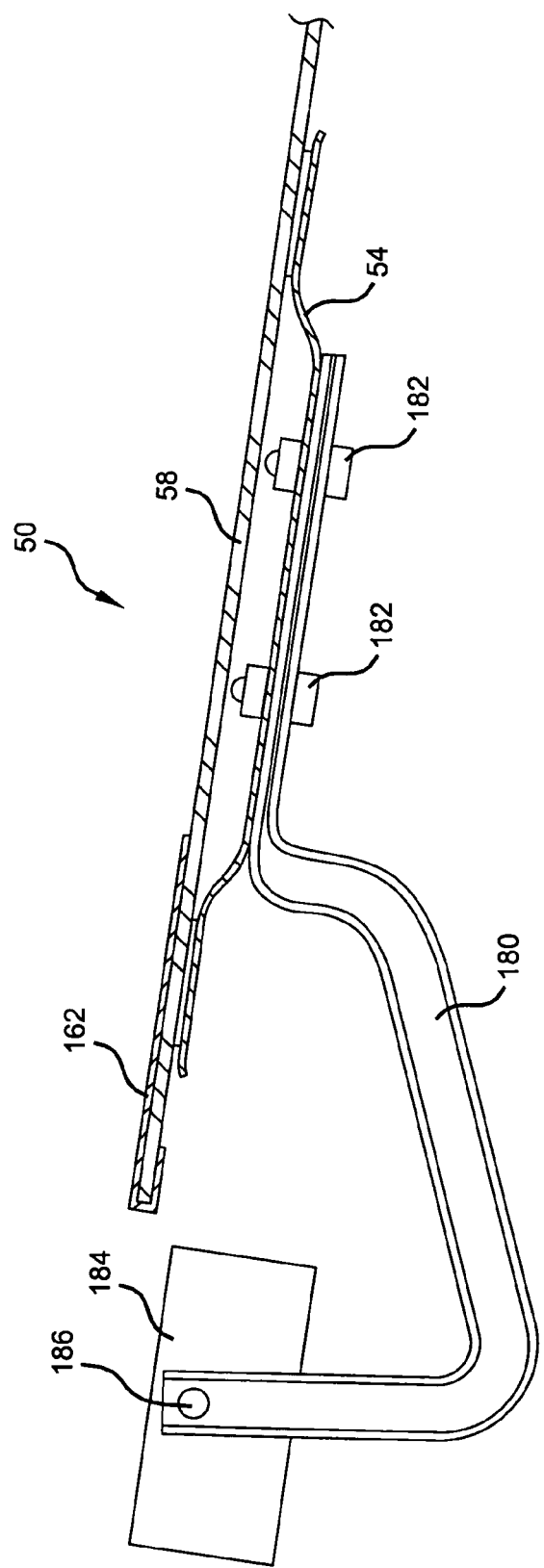
FIG. 7 is a partial cross-sectional view along line 7-7 of FIG. 1A.

Referring now to FIG. 7, a front portion of liftgate 50 is pivotally coupled to vehicle 20 with bracket 180. Bracket 180 is attached to front member 54 of liftgate 50 with fasteners 182. Bracket 180 is pivotally coupled to a bracket 184 at pivot 186. Bracket 184 is fixedly attached to roof 28 of vehicle 20. For example, bracket 184 can be attached to cross-member 166. Pivot 186 is aligned with pivot axis 160. Bracket 180 thereby enables liftgate 50 to pivot about pivot 186 and pivot axis 160 and move between the closed and open positions.

Referring now to FIGS. 1 and 3, operation of open air system 22 is described. Liftgate 50 can be moved from a closed position, shown in FIG. 1A, to an open position, shown in FIG. 1B. Movement of liftgate 50 can be performed independently of the movement of roof panel 66. That is, roof panel 66 can remain in its closed position, while liftgate 50 moves between the open and closed positions, as shown in FIGS. 1A and 1B.

Figure 1C:
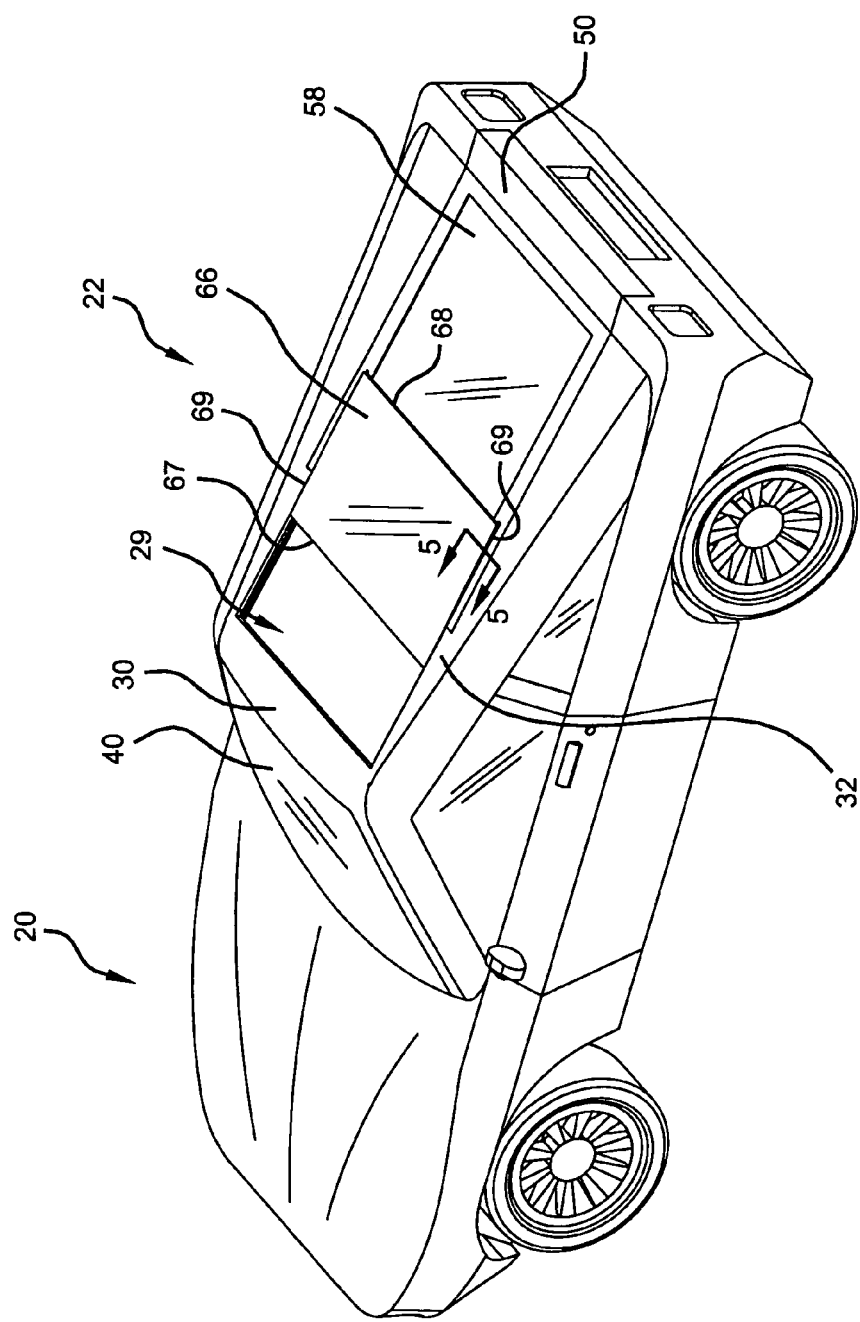
Figure 1D:
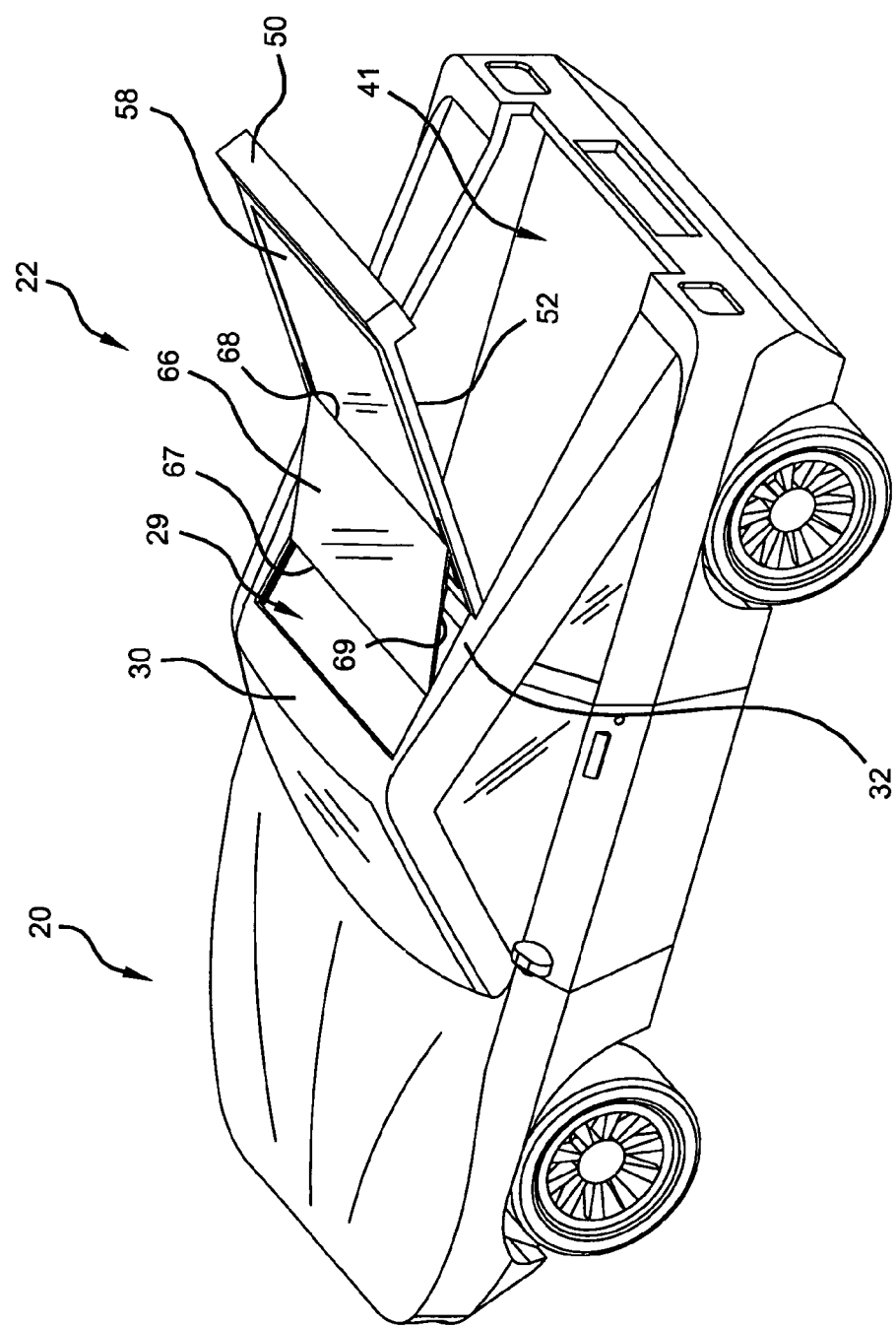

Roof panel 66 can be moved in a fore-and-aft direction while liftgate 50 is in the closed position. For example, roof panel 66 can be moved from its closed position, as shown in FIG. 1A, to its open position, as shown in FIG. 1C. When in the open position, roof panel 66 allows passenger seating area 29 to be exposed to the environment, thus providing an open air motoring experience for passengers of vehicle 20. When roof panel 66 is in the open position, liftgate 50 can be moved from the closed position, as shown in FIG. 1C, to the open position, as shown in FIG. 1D. Moreover, liftgate 50 can be operated between the open and closed positions regardless of the position of roof panel 66. That is, liftgate 50 can be moved between its open and closed positions with roof panel 66 in a closed position, such as that shown in FIGS. 1A and 1B, its fully-open position, such as that shown in FIGS. 1C and 1D, or an intermediate position therebetween.

When liftgate 50 and roof panel 66 are in the closed position, liftgate 50 and roof panel 66 form a weathertight seal with seal 160. To move roof panel 66 from the closed position to the open position, cable drive assembly 74 is commanded to cause motor 76 to pull the fixed ends of cables 78, 80 rearwardly. The pulling of cables 78, 80 rearwardly pulls carriages 82, 84 rearwardly along tracks 140. When roof panel 66 is in the closed position, pin 86 in carriage 84 is disposed in upper portion 132 of slot 130, as shown in FIG. 3A. When carriage 84 begins to move rearwardly, pin 86 moves along slot 130 and engages with intermediate portion 136. This movement of pin 86 along intermediate portion 136 causes the rear portion of roof panel 66 to move upwardly, as shown in FIG. 3B. Continued rearward movement of carriage 84 eventually results in pin 86 engaging with the end of lower portion 134 of slot 130, as shown in FIG. 3C. The vertical distance over which the rear portion of roof panel 66 is moved is dependent upon the vertical distance between upper and lower portions 132, 134 of slot 130. The vertical distance is designed so that the rear portion of roof panel 66 has adequate clearance above liftgate 50 to enable rear panel 66 to move rearwardly relative thereto and assume a position wherein a portion of roof panel 66 is disposed above liftgate 50. The vertical distance is also selected to enable liftgate 50 to operate between open and closed positions with roof panel 66 in its open position or in an intermediate position between the open and closed positions.

With pin 86 engaged with the end of lower portion 134 of slot 130, continued rearward movement of carriage 84 pulls roof panel 66 rearwardly, as shown in FIG. 3C. Roller 104 on front leg 100 of roof panel 66 moves along track 106 in roof frame member 132. Cable drive assembly 74 continues to pull roof panel 66 rearwardly until a desired position of roof panel 66 is obtained. Cable drive assembly 74 can be commanded to cease movement of roof panel 66 at intermediate positions between the open and closed positions. For example, cable drive assembly 74 can be commanded to only cause the rear portion of roof panel 66 to move to an elevated position thereby allowing increased ventilation of the passenger area 29 of vehicle 20.

To move roof panel 66 from an open or intermediate position back to the closed position, cable drive assembly 74 is commanded to cause motor 76 to push the fixed ends of cables 78, 80 forwardly, thereby resulting in forward movement of carriages 82, 84. This forward movement is translated into forward motion of roof panel 66 through the engagement of pin 86 in slot 130. To inhibit pin 86 from moving into upper portion 132 of slot 130 prior to roof panel 66 being in a forwardmost position, a guide member can ride along a projection on side member 52 that maintains roof panel 66 in the raised position thereby enabling pin 86 and carriage 84 to push roof panel 66 forwardly while the rear portion of roof panel 66 is elevated. Alternatively, a detent mechanism within slot 130 can be employed that inhibits the movement of pin 86 within slot 130 when the force being imparted therebetween is less than a predetermined value. Once roof panel 66 is moved to its fully-closed position, pin 86 moves along intermediate portion 136 and into upper portion 132 of slot 130. This motion pulls the rear portion of roof panel 66 downwardly to obtain the closed position, as shown in FIG. 3A.

Referring now to FIGS. 8-12, a vehicle 1020 having an open air system 1022 according to a second preferred embodiment of the present invention is shown. Open air system 1022 is similar to open air system 22 of the first embodiment with the main differences being that open air system 1022 includes multiple moveable roof panels with the rearmost roof panel moving rearwardly to a position that is below the liftgate. As such, in the following description the components that are similar between open air system 1022 and open air system 22 may or may not be described. Rather, the differences between the open air systems will be described.

Figure 8A:
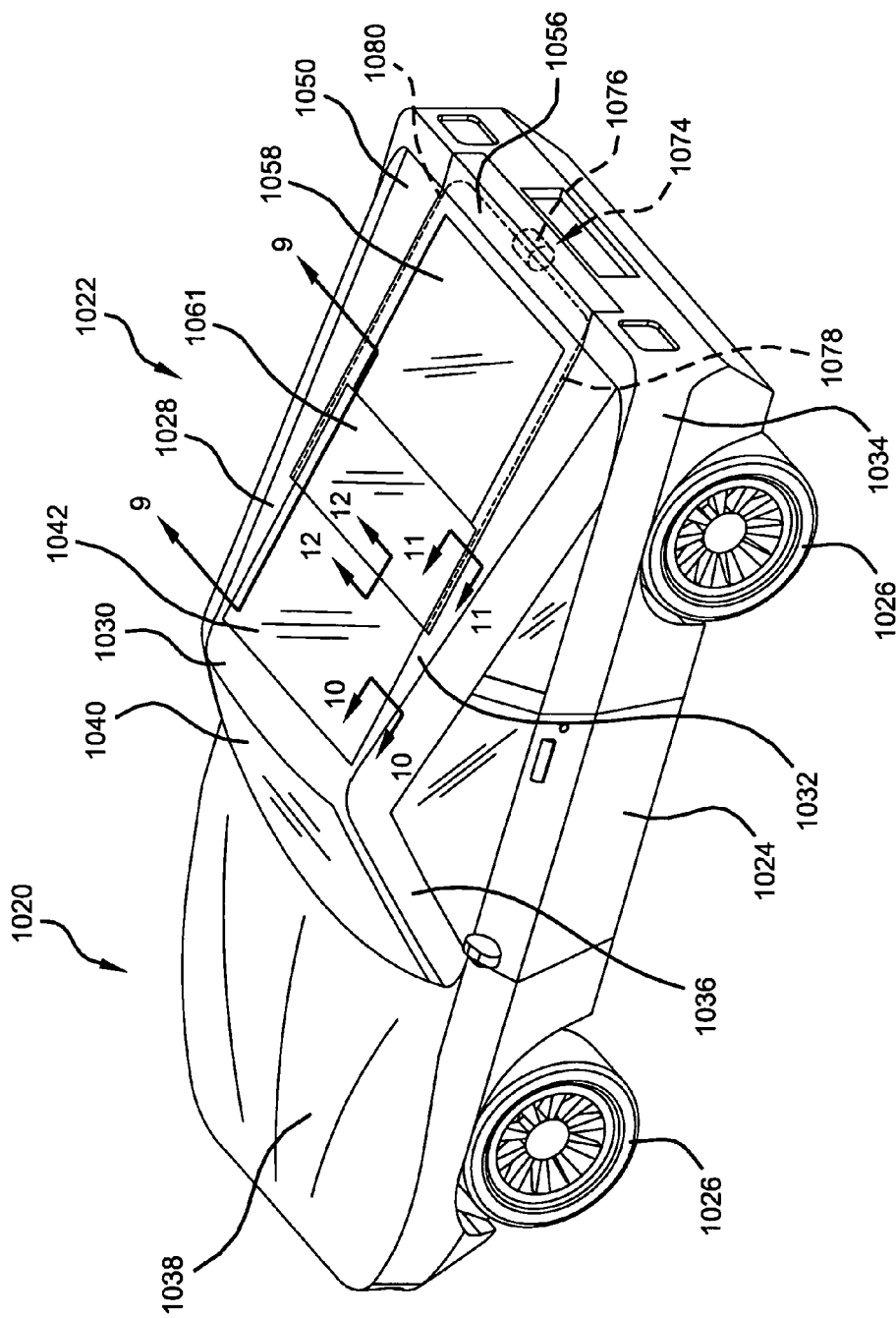
Figure 8B:
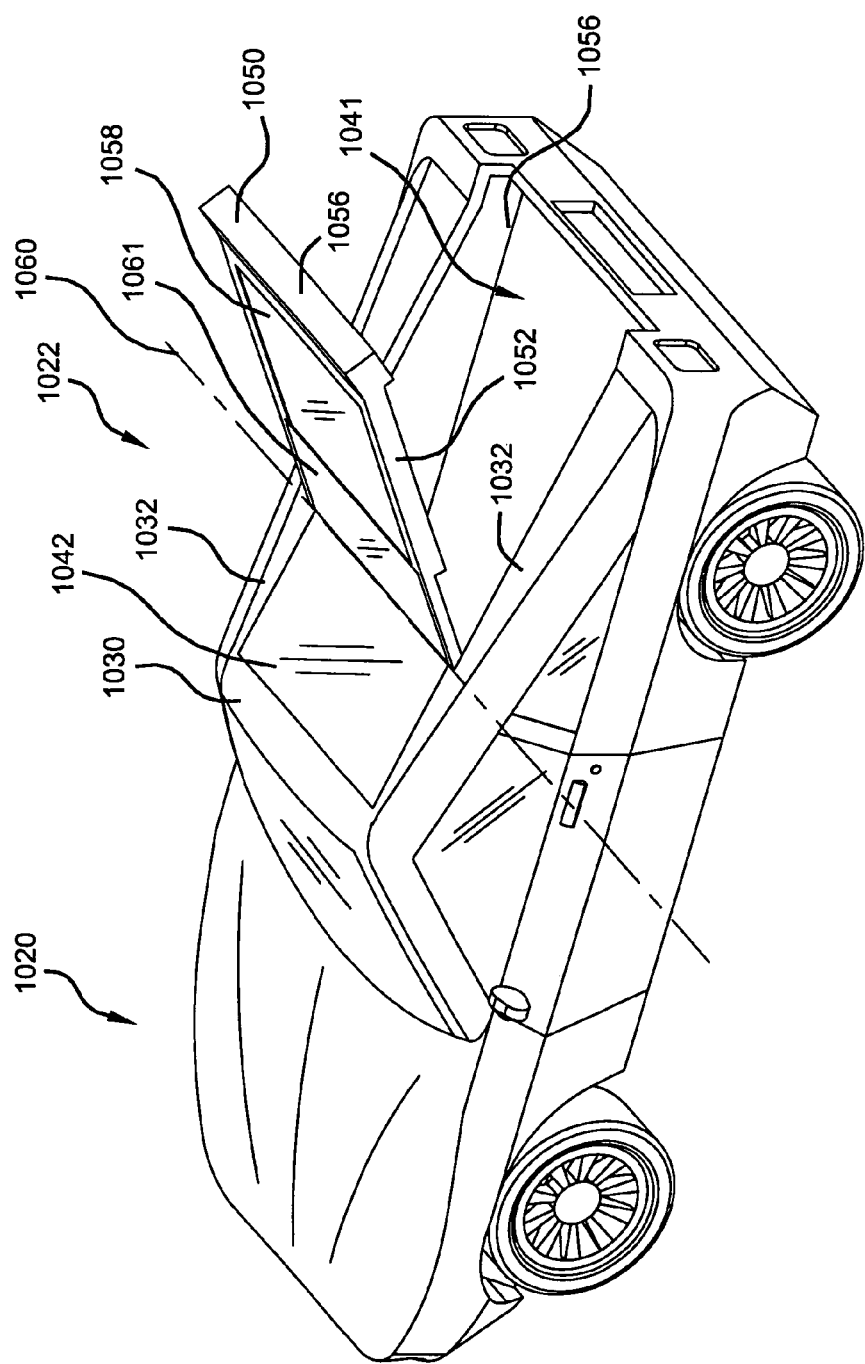

Open air system 1022 includes a liftgate 1050 that is moveable between a closed position, as shown in FIG. 8A, to an open position, as shown in FIG. 8B. Liftgate 1050 pivots about a pivot axis 1060.

Open air system 1022 includes a first or forwardmost moveable roof panel 1042 having a front edge 1043, a rear edge 1044, and side edges 1045 extending therebetween. Open air system 1022 also includes a second or rearmost moveable roof panel 1061 having a front edge 1062, a back edge 1063, and side edges 1064 extending therebetween. Roof panels 1042, 1061 are moveable in a fore-and-aft direction along vehicle 1020 and liftgate 1050. Open air system 1022 utilizes motorized cable drive assembly 1074 to move roof panels 1042, 1061 between the open and closed positions. Cable drive assembly 1074 is essentially the same as cable drive assembly 74 utilized in open air system 22 according to the first preferred embodiment and again utilizes carriages that are coupled to the rear portion of a roof panel to move the roof panels between the open and closed positions. As such, details of cable drive assembly 1074 are not described further.

Figure 8C:
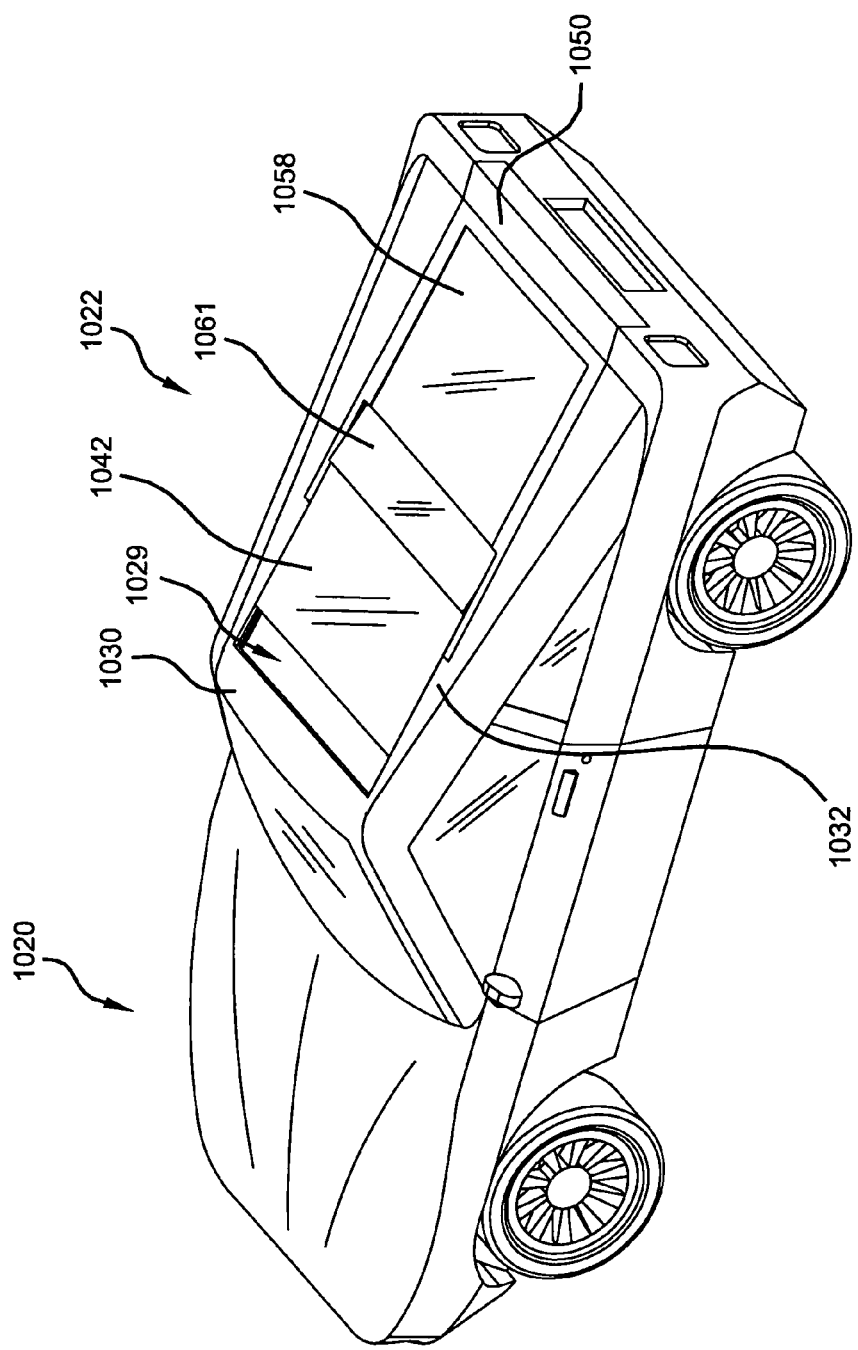
Figure 8E:
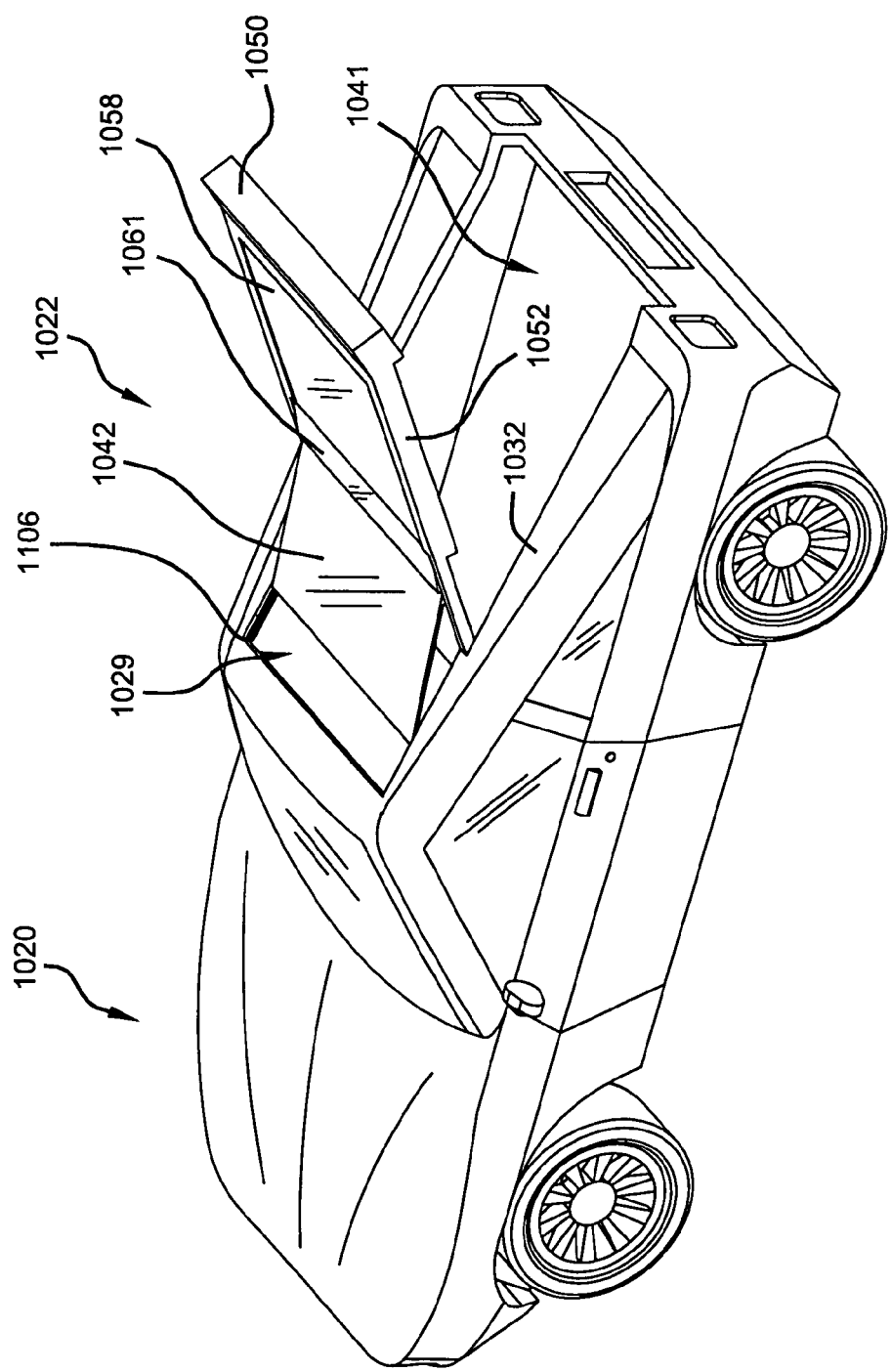

Referring to FIGS. 8A, 8C and 8D, roof panels 1042, 1061 are moveable in a fore-and-aft direction relative to liftgate 1050 from a closed position, as shown in FIG. 8A, through intermediate positions, such as that shown in FIG. 8C, to a fully open position, as shown in FIG. 8D. In open air system 1022, second roof panel 1061 slides rearwardly below liftgate 1050 and below backlite 1058 therein. In the fully-open position, a majority of second roof panel 1061 is disposed below backlite 1058, as shown in FIG. 8D. First roof panel 1042 does not move below liftgate 1050 or below backlite 1058 therein. As can be seen in FIG. 8E, liftgate 1050 can move between the open and closed positions with roof panels 1042, 1061 in the fully-opened position. Additionally, liftgate 1050 can move between the open and closed position with roof panels 1042, 1061 in any intermediate position. That is, liftgate 1050 can move between the open and closed positions regardless of the position of the first and second roof panels 1042, 1061.

Figure 9A:
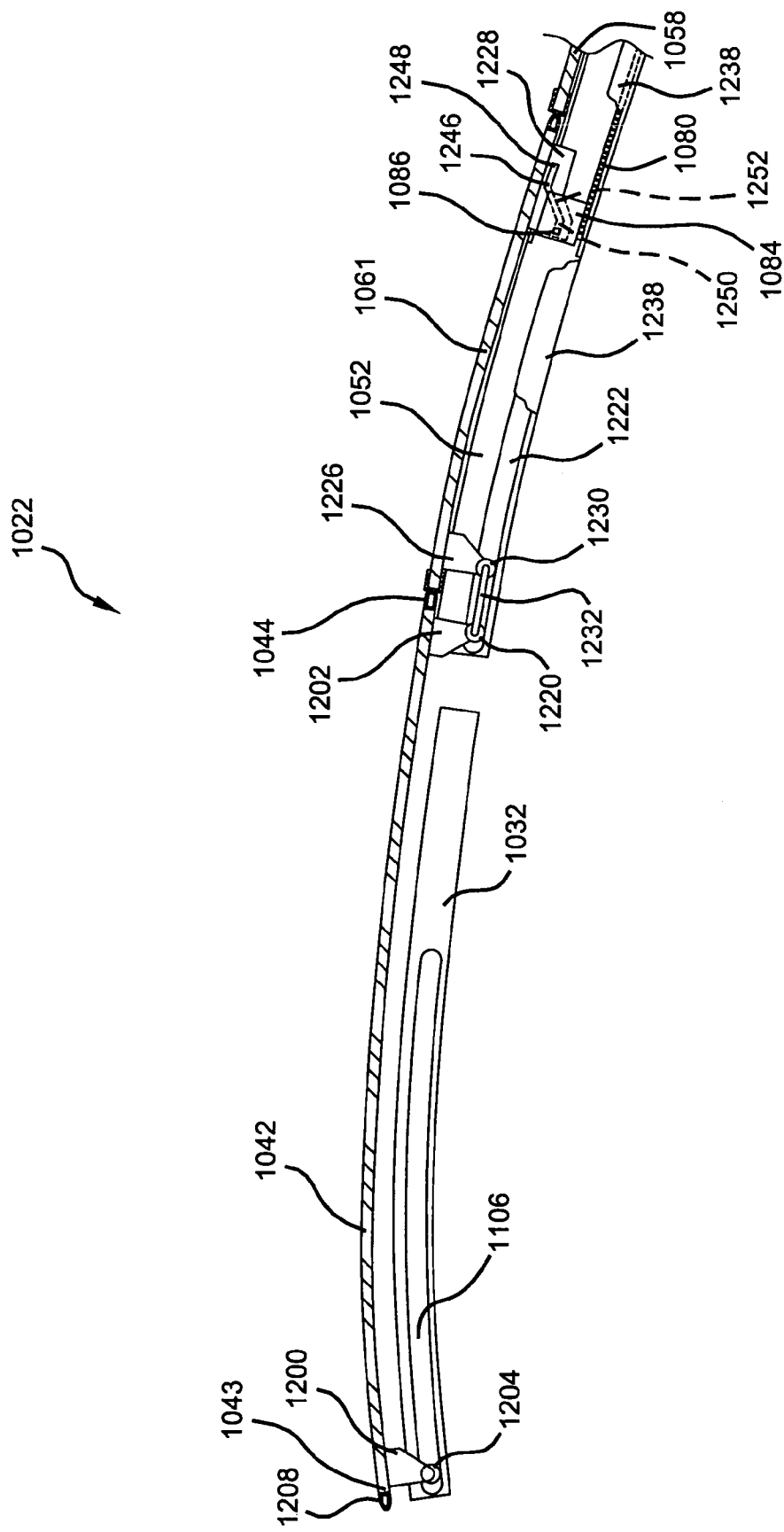
FIGS. 9A-D are cross-sectional views along line 9-9 of FIG. 8A showing the open air system in various positions.
Figure 9B:
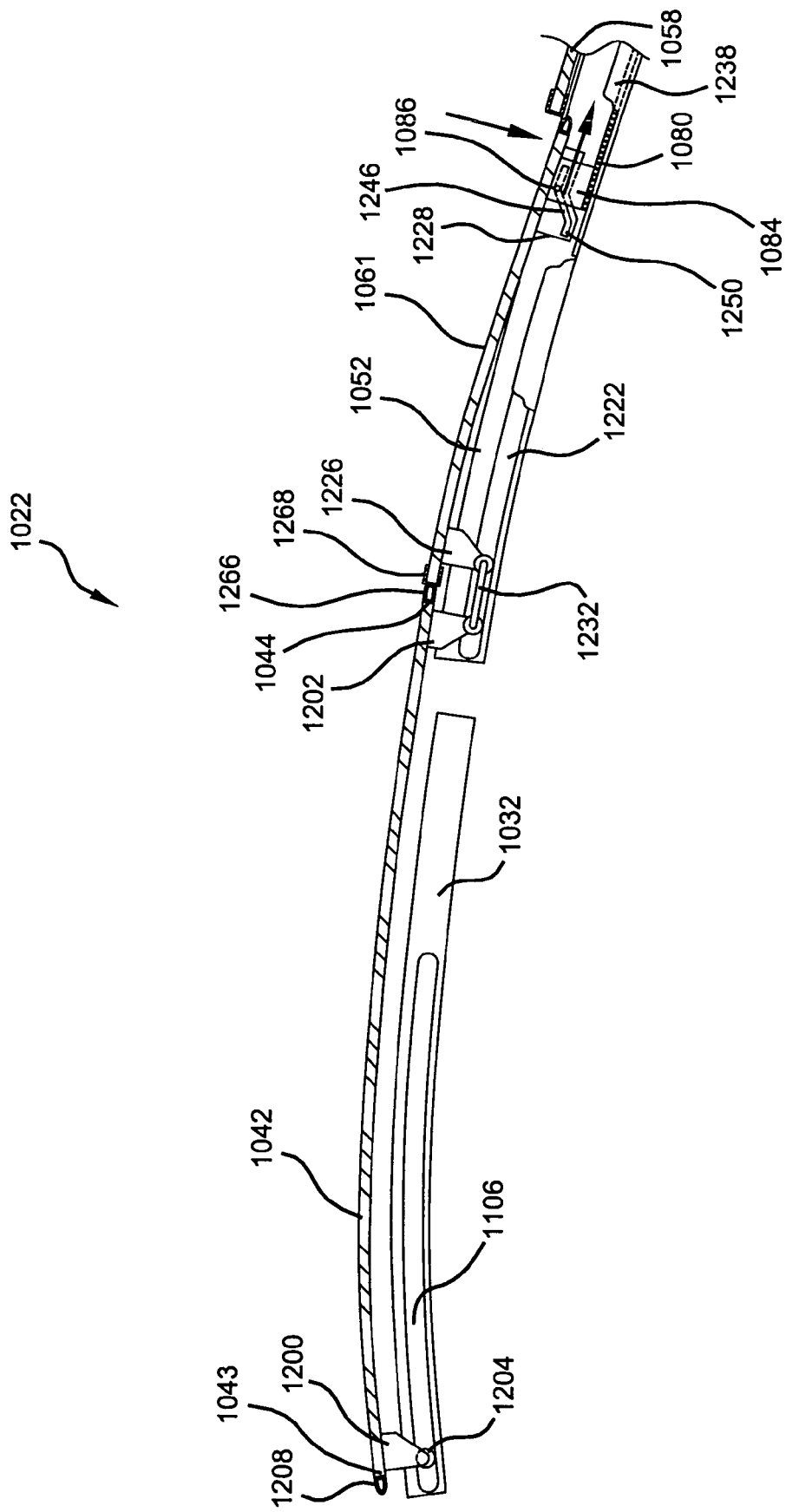
Figure 9C:
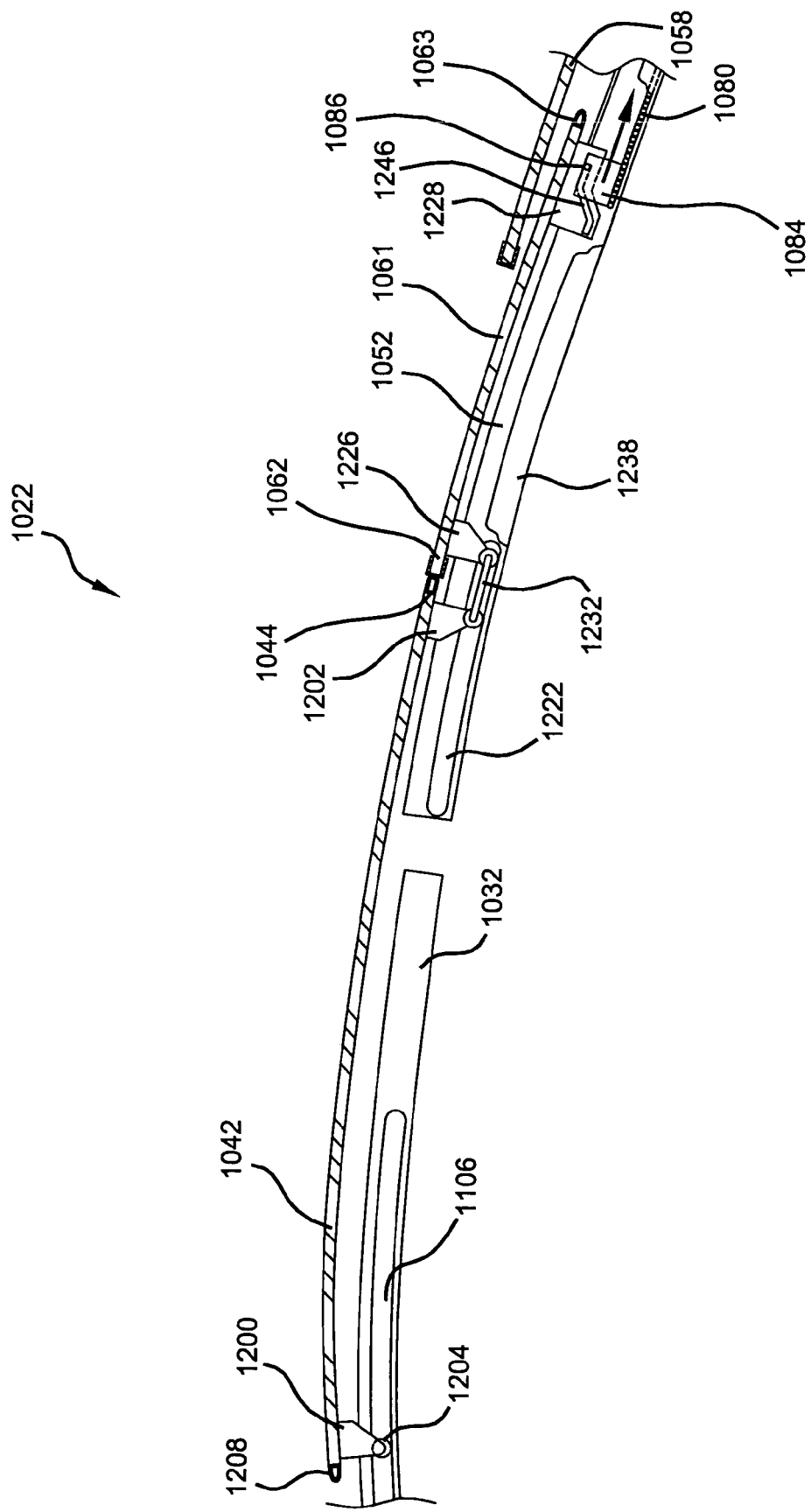
Figure 9D:
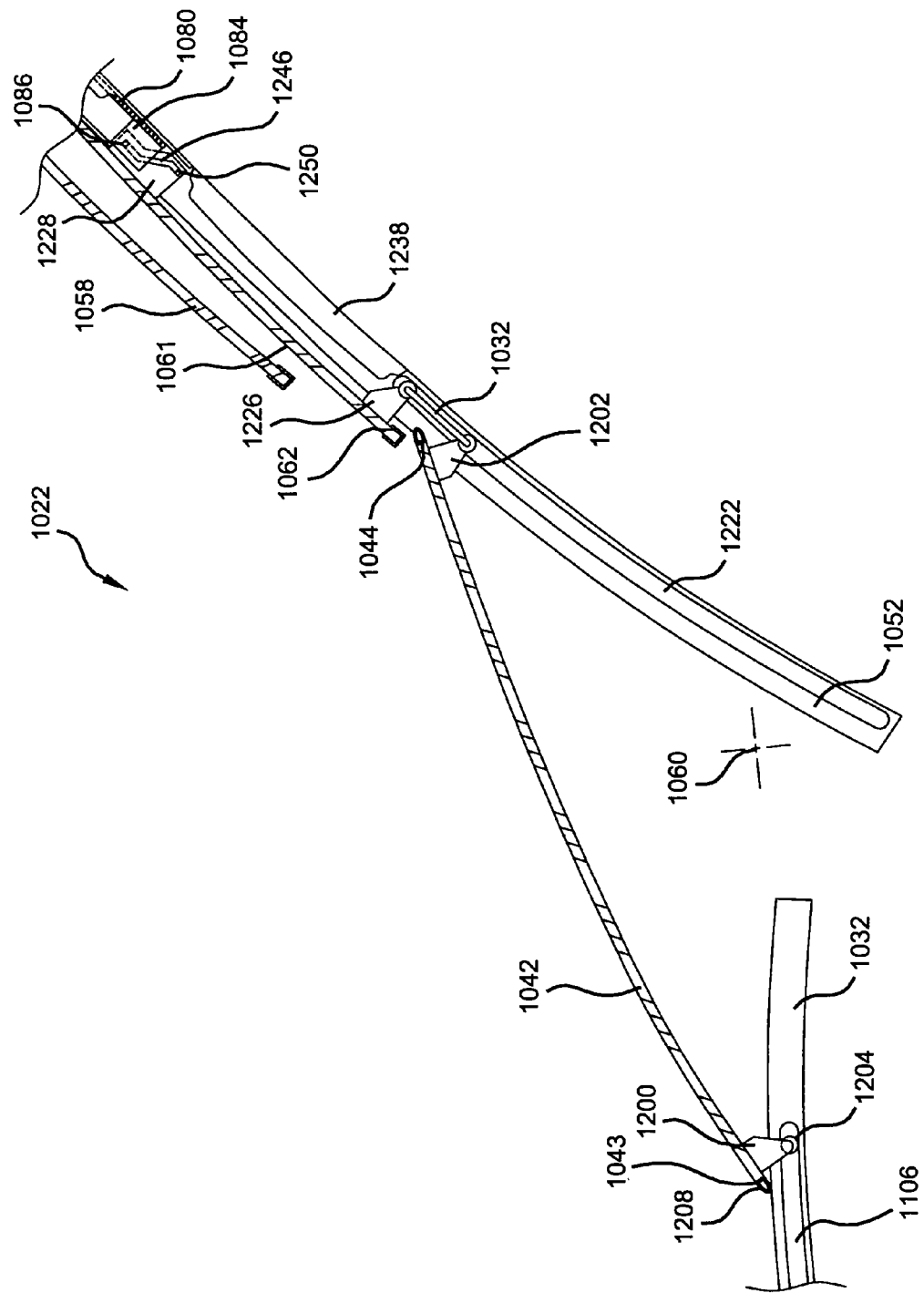
Figure 10:
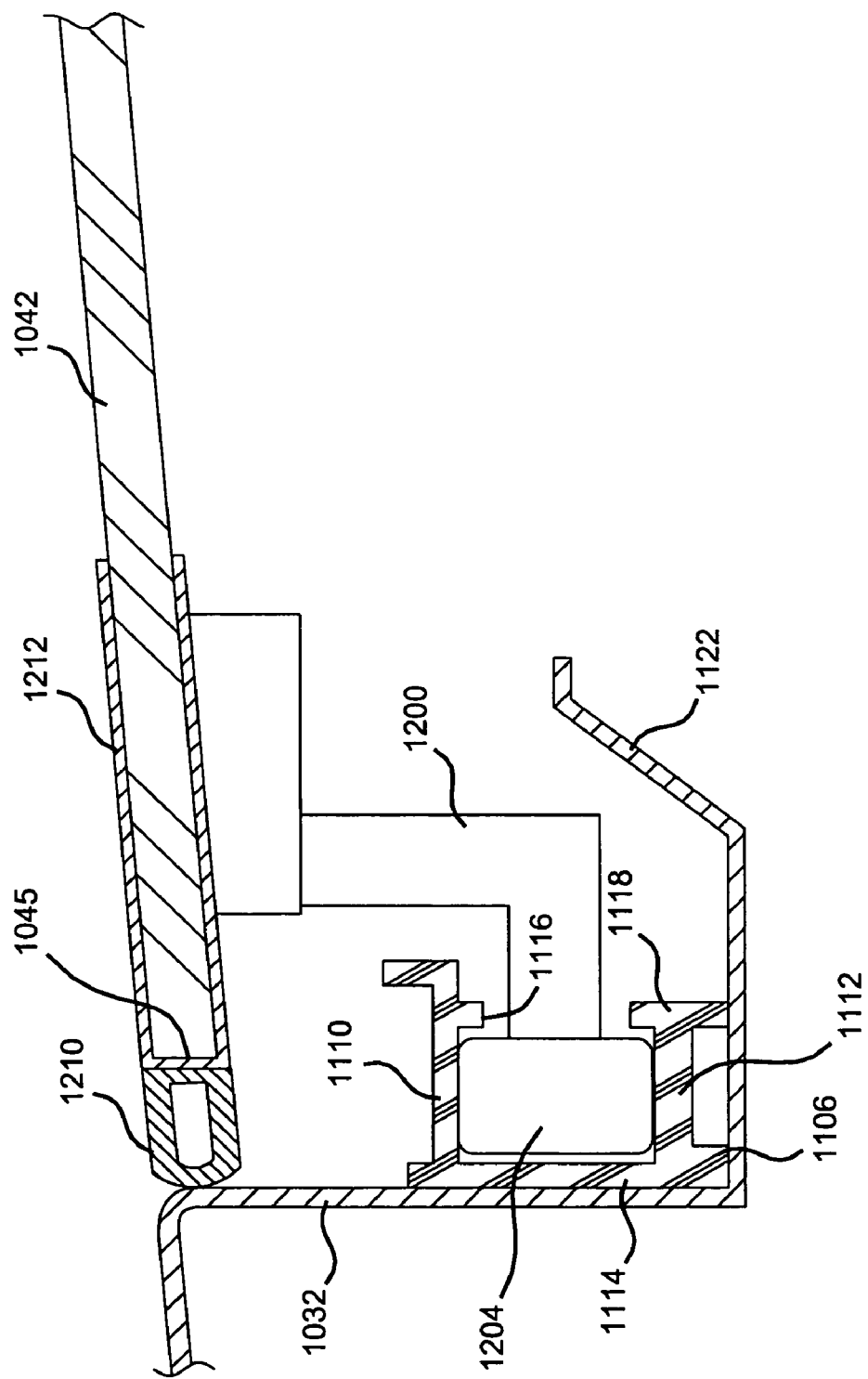
FIG. 10 is a cross-sectional view along line 10-10 of FIG. 8A.

Referring to FIGS. 9-12, details of the interconnection of roof panels 1042, 1061 with roof 1028 and liftgate 1050 are shown. First roof panel 1042 has front and rear legs 1200, 1202 that are attached adjacent the respective front and back edges 1043, 1044 adjacent side edge 1045. Front leg 1200 includes a roller 1204 that rides within a track 1106 of roof frame member 1032. Front leg 1200 and roof panel 1042 can pivot relative to roller 1204. A seal 1208 is attached to front edge 1043 and can form a weather-tight seal against front header 1030 when roof panel 1042 is in the closed position. Track 1106, as shown in FIG. 10, is essentially the same as track 106 in open air system 22. As such, further details of track 1106 and the limiting of the movement of roller 1204 therein will not be described further. A seal 1210 extends along a garnish or trim piece 1212 on side edge 1045 of roof panel 1042. Seal 1210 can form a weather-tight seal against roof frame member 1032 when roof panel 1042 is in the closed position.

Figure 11:
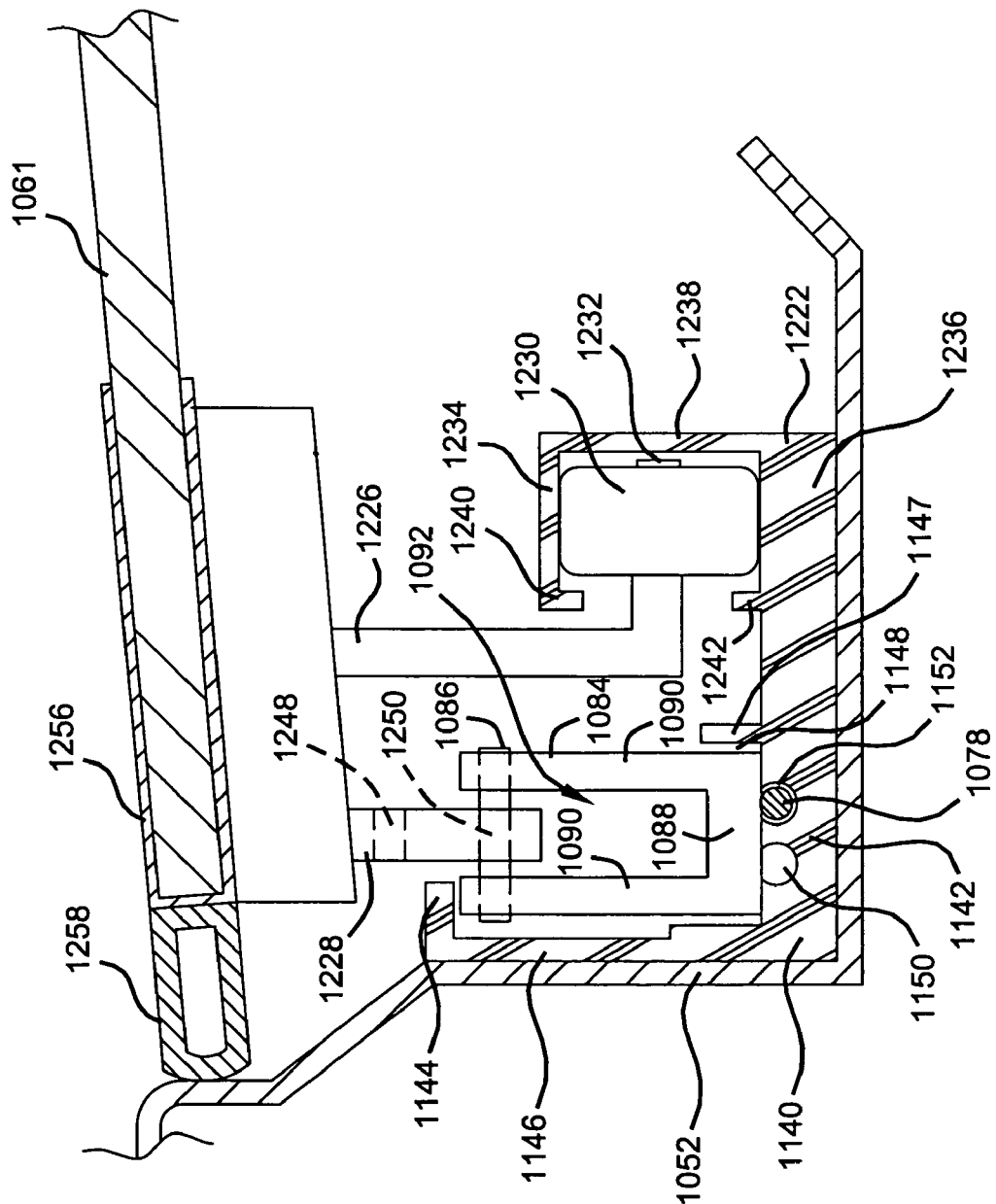
FIG. 11 is a cross-sectional view along line 11-11 of FIG. 8A.

Rear leg 1202 of first roof panel 1042 includes a roller 1220 that moves along a track 1222 in side member 1052 of liftgate 1050. Second roof panel 1061 also includes front and rear legs 1226, 1228, respectively. Front leg 1226 has a roller 1230 that also moves along track 1222 along with roller 1220 of rear leg 1202 of first roof panel 1042. Rear leg 1202 of first roof panel 1042 is coupled to front leg 1226 of second roof panel 1061 with connecting member 1232. Connecting member 1232 extends from roller 1220 to roller 1230. Connecting member 1232 allows second roof panel 1061 to drive movement of first roof panel 1042 as described below. Track 1222, as best seen in FIG. 11, includes top and bottom walls 1234, 1236 with a sidewall 1238 extending therebetween. Projections 1240, 1242 extend from top and bottom walls 1234, 1236, respectively, and are spaced apart from sidewall 1238. Top wall 1234, bottom wall 1236, sidewall 1238 and projections 1240, 1242 help maintain rollers 1230, 1220 within track 1222 and allow limited movement therealong. Rear leg 1202 and front leg 1226 can pivot about their respective rollers 1220, 1230 when roof panels 1042, 1061 are moving between the open and closed positions and when liftgate 1050 is moving between its open and closed positions.

Rear leg 1228 of second roof panel 1061 includes a slot 1246 within which pin 1086 of carriage 1084 is disposed. Slot 1246 includes an upper substantially-horizontal portion 1248, a lower substantially-horizontal portion 1250 and an intermediate portion 1252 extending diagonally therebetween. Lower portion 1250 is disposed in front of upper portion 1248. Rear leg 1228 is coupled to carriage 1084 and rides along track 1140 in side member 1052 of liftgate 1050. Track 1140 is substantially the same as track 140 described above with reference to the first preferred embodiment. As such, track 1140 includes a base 1142, a top 1144 and a sidewall 1146 extending therebetween. A projection 1147 extends upwardly from base 1142 opposite sidewall 1146. Base 1142, top 1144, sidewall 1146 and projection 1147 form a channel 1148 within which carriage 1048 travels when roof panels 1042, 1061 are moving between the open and closed positions, as described below. Guides 1150 and 1152 are disposed in base 1142 of track 1140. Guides 1150, 1152 are configured to receive and direct the movement of the cables of cable drive assembly 1074. For example, as shown in FIG. 11, cable 1078 is disposed in guide 1152. It should be appreciated that the other cable (not shown) will be disposed in guide 1150. Cable 1078 is fixedly attached to carriage 1084 so that movement of cable 1078 causes movement of carriage 1084 along track 1140. Tracks 1140, 1222 can be integral, as shown, or alternatively, can be separate tracks that are secured to side member 1052 of liftgate 1050.

A garnish or trim piece 1256 can be disposed along side edge 1064 of second roof panel 1061. A seal 1258 can be attached to trim 1256 and can form a weather-tight seal against side member 1052 of liftgate 1150 when second roof panel 1061 is in the closed position.

Figure 12:
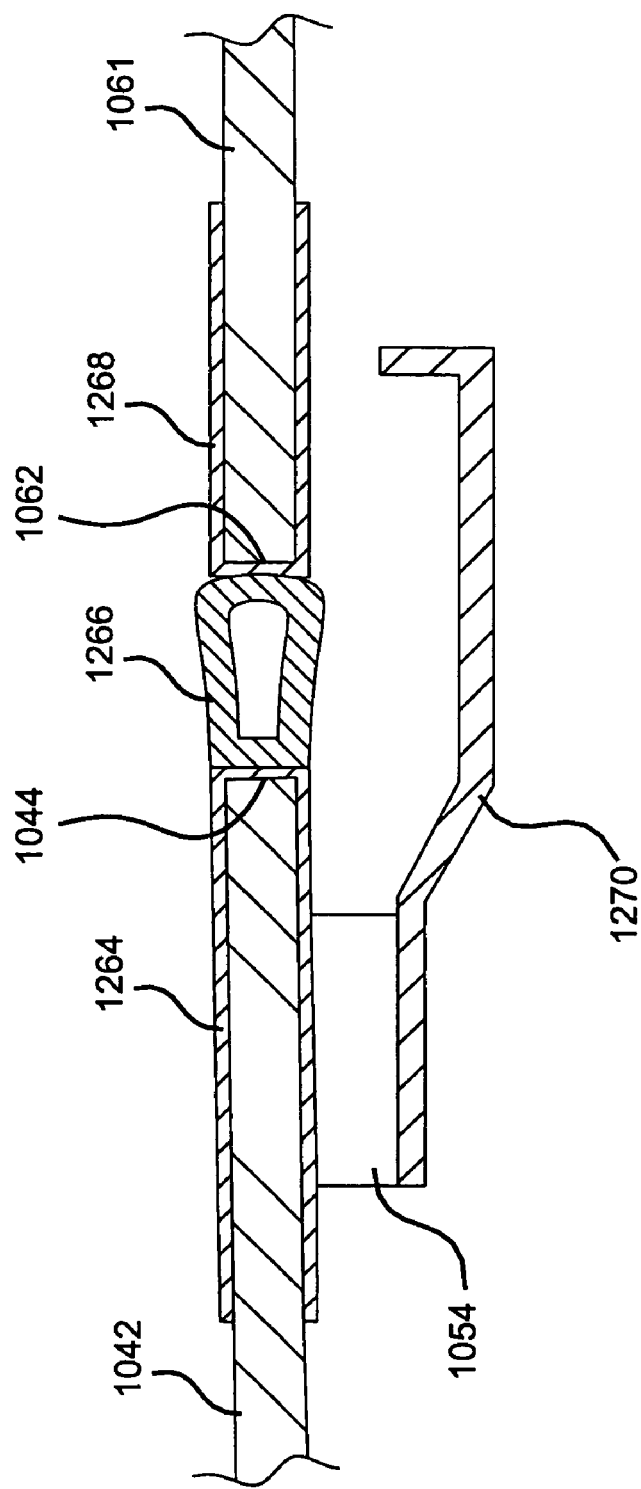
FIG. 12 is a cross-sectional view along line 12-12 of FIG. 8A.

Referring now to FIG. 12, the interaction between the back edge 1044 of first roof panel 1042 and front edge 1062 of second roof panel 1061 is shown. A trim or garnish piece 1264 can be disposed along back edge 1044 of first roof panel 1042. A seal 1266 can be attached to trim 1264. A trim or garnish piece 1268 can be disposed along front edge 1062 of second roof panel 1061. Seal 1266 can engage against and form a weather-tight seal with trim 1268 when first and second roof panels 1042, 1061 are in the closed position, as shown. Front member 1054 of liftgate 1050 can have a trough portion 1270 that extends below seal 1266 and can catch any water that leaks past seal 1266 and direct it to a desired drainage location.

Liftgate 1050 is secured to vehicle 1020 with a hinge bracket, similar to that shown in FIG. 7 and discussed above with reference to the first preferred embodiment of open air system 22. As such, the interaction of the pivotal connection between liftgate 1050 and roof 1028 of vehicle 1020 is not discussed further.

In operation, cable drive assembly 1074 can be commanded to move roof panels 1042, 1061 between the open and closed positions. When roof panels 1042, 1061 are in the closed position, as shown in FIG. 9A, pin 1086 of carriage 1084 is disposed in lower portion 1250 of slot 1246. To move roof panel 1042, 1061 from the closed position to the open position, cable drive assembly 1074 is commanded to pull the carriages attached to rear legs 1228 of second roof panel 1061 rearwardly. This rearward pulling on the carriages causes pin 1086 to move along lower portion 1250 of slot 1246 and enter into intermediate portion 1252. As pin 1086 moves along intermediate portion 1252, the rear portion of second roof panel 1061 is pulled downwardly, as shown in FIG. 9B. The continued rearward movement of the carriage causes pin 1086 to enter into upper portion 1248 of slot 1246 and the rear portion of second roof panel 1061 drops below the level of backlite 1058 of liftgate 1050. The distance between upper and lower portions 1248, 1250 is designed so that second roof panel 1061 drops a distance sufficient to allow second roof panel 1061 to slide beneath backlite 1058, as shown in FIG. 9C.

Continued rearward movement of the carriages coupled to rear legs 1228 of second roof panel 1061 causes pin 1086 to move to the end of the upper portion 1248 of slot 1246 and pull second roof panel 1061 rearwardly beneath backlite 1058 of liftgate 1050. Front legs 1226 of second roof panel 1061 move along track 1222 of side member 1052 of liftgate 1050. Connecting member 1232 pulls on rear leg 1202 of first roof panel 1042 which causes rear leg 1202 to move along track 1222 with the movement of second roof panel 1061. Movement of rear leg 1202 of first roof panel 1042 causes front leg 1200 of first roof panel 1042 to move along track 1106. Cable drive assembly 1074 can continue to pull the carriages rearwardly until roof panels 1042, 1061 obtain their full open position, as shown in FIG. 8D. Alternatively, cable drive assembly 1074 can be commanded to stop moving roof panels 1042, 1061 at any position between the open and closed positions, such as that shown in FIG. 8C.

To move roof panels 1042, 1061 to the closed position, cable drive assembly 1074 is commanded to push the cables and the associated carriages coupled to rear legs 1228 of second roof panel 1061 forward. This forward movement of rear legs 1228 is translated into forward movement of both second roof panel 1061 and first roof panel 1042. When second roof panel 1061 is in a sufficient position, continued forward movement of the carriages causes pin 1086 to move from upper portion 1248 to lower portion 1250 of slot 1246. The movement of pin 1086 through slot 1246 thereby causes the rear portion of second roof panel 1061 to move upwardly and into its fully closed position with a weather-tight engagement with liftgate 1050. Thus, cable drive assembly 1074 can be commanded to move roof panels 1042, 1061 between the open and closed position and any intermediate position therebetween. Similarly to the first preferred embodiment of open air system 22, the second preferred embodiment of open air system 1022 can also utilize a projection or detent-type mechanism to inhibit the motion of pin 1086 within slot 1246 to coordinate the raising and lowering of the rear portion of second roof panel 1061 relative to liftgate 1050.

Open air system 1022 allows liftgate 1050 to be moved between its open and closed positions regardless of the position of first and second roof panels 1042, 1061. That is, liftgate 1050 can be moved between the open and closed positions with first and second roof panels 1042, 1061 in the closed position, the open position, or in any intermediate position therebetween. This is facilitated by the engagement of rear legs 1202 of first roof panel 1042 with track 1222 in side members 1052 of liftgate 1050. This engagement results in the rear portion of first roof panel 1042 rising upwardly with the movement of liftgate 1050 from the closed position to the open position, such as shown in FIG. 8E.

Thus, a vehicle utilizing an open air system according to the various embodiments of the present application has the ability to open the liftgate regardless of the position of the moveable roof panels. This ability allows access to the storage area when the roof panels are in an open position, thereby avoiding the necessity of moving the roof panels to the closed position to operate the liftgate. This ability can reduce the wear and tear on the open air system. Moreover, the occupants of the vehicle can enjoy the open air experience without being concerned with the inconvenience of closing the roof panels to allow access to the storage area via the liftgate.

While the present invention has been described with reference to two preferred embodiments, it should be appreciated that these various features and functions disclosed therein can be combined, altered and/or removed without deviating from the scope of the present invention. For example, additional garnishes or trim pieces can be employed to the open air system of the vehicle to provide a desired aesthetic appearance and/or to enhance management of water flow. Additionally, the dimensions, shapes, kinematics and orientations of the various components can differ from that shown based on the design of the vehicle and the desired design of the open air system. Moreover, while several legs of the roof panels are shown as moving along the tracks with rollers, it should be appreciated that sliders or members that slide along the tracks can be utilized in addition to or in lieu of the rollers. Thus, the description of the invention is merely exemplary in nature and variations that do not depart from the gist of the invention are intended to be within the scope of the invention. Such variations are not to be regarded as a departure from the spirit and scope of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automotive vehicle open air system comprising:
a fixed roof member;
a liftgate coupled to said fixed roof member and operable between open and closed positions;
a backlite disposed in said liftgate; and
at least one roof panel moveable in a fore and aft direction between first and second positions, a majority of said at least one roof panel being forward of said backlite when in said first position, and a portion of said at least one roof panel being vertically adjacent a portion of said backlite and moving with movement of said liftgate when in said second position, wherein said liftgate is operable between said open and closed positions regardless of a position of said at least one roof panel.

2. The open air system of claim 1, wherein said at least one roof panel is one of a plurality of moveable roof panels, said liftgate includes a pair of fore and aft extending tracks, a first one of said roof panels slides along said pair of tracks in said liftgate when moving between said first and second positions and a portion of a second one of said roof panels slides along said pair of tracks in said liftgate when moving between said first and second positions.

3. The open air system of claim 2, wherein a different portion of said second roof panel slides along a different pair of fore and aft extending tracks when moving between said first and second positions.

4. The open air system of claim 3, wherein said different pair of tracks are disposed along a roof opening.

5. The open air system of claim 3, wherein said different portion of said second roof panel is always coupled to said different pair of tracks.

6. The open air system of claim 2, wherein a majority portion of said first roof panel is disposed below said backlite when in said second position.

7. The open air system of claim 1, further comprising a drive mechanism operable to drive movement of said at least one roof panel between said first and second positions.

8. The open air system of claim 7, wherein said drive mechanism includes a motor and at least one cable, said motor operable to cause movement of said at least one cable to drive movement of said at least one roof panel between said first and second positions.

9. The open air system of claim 7, wherein said drive mechanism is disposed in said liftgate.

10. The open air system of claim 1, wherein said liftgate has a pair of fore and aft extending tracks and said portion of said at least one roof panel moves along said tracks when moving between said first and second positions.

11. The open air system of claim 10, wherein a different portion of said at least one roof panel moves along a different set of fore and aft extending tracks as said at least one roof panel moves between said first and second positions.

12. The open air system of claim 1, wherein said portion of said at least one roof panel is above said portion of said backlite when in said second position.

13. The open air system of claim 1, wherein said portion of said at least one roof panel is below said portion of said backlite when in said second position.

14. The open air system of claim 1, wherein said portion of said at least one roof panel is a rear portion.

15. The open air system of claim 1, wherein a rear portion of said at least one roof panel is always coupled to a portion of said liftgate.

16. The open air system of claim 1, wherein said liftgate pivots about an axis when moving between said open and closed positions.

17. The open air system of claim 1, wherein said at least one roof panel slides along a portion of said liftgate when moving between said first and second positions.

18. An automotive vehicle open air system comprising:
a fixed roof member;
a liftgate coupled to said fixed roof member and operable between open and closed positions; and
a roof panel moveable in a fore and aft direction between first and second positions,
wherein a first portion of said roof panel is engaged with said liftgate, said first portion of said roof panel moves with said liftgate when in at least one of said first and second positions, and a second portion of said roof panel is engaged with said fixed roof structure.

19. The open air system of claim 18, wherein said first portion of said roof panel slides along said liftgate and said second portion of said roof panel slides along said fixed roof member when moving between said first and second positions.

20. The open air system of claim 19, wherein said first and second portions of said roof panel slide along respective tracks in said liftgate and said fixed roof member when moving between said first and second positions.

21. The open air system of claim 18, further comprising a backlite disposed in said liftgate and wherein said first portion of said roof panel is vertically adjacent a portion of said backlite when in said second position.

22. The open air system of claim 21, wherein said first portion of said roof panel is above said portion of said backlite when in said second position.

23. The open air system of claim 18, wherein said liftgate is operable between said open and closed positions regardless of a position of said roof panel.

24. The open air system of claim 18, wherein said first portion of said roof panel is always engaged with said liftgate and said second portion of said roof panel is always engaged with said fixed roof member.

25. The open air system of claim 18, further comprising a drive mechanism operable to drive movement of said roof panel between said first and second positions.

26. The open air system of claim 18, wherein at least a portion of said roof panel allows visible light to pass therethrough.

27. The open air system of claim 18, further comprising a backlite disposed in said liftgate and wherein said first portion of said roof panel is forward of said backlite when in said first position.

* * * * *